(12) United States Patent
Shibayama et al.

(10) Patent No.: US 7,533,375 B2
(45) Date of Patent: May 12, 2009

(54) PROGRAM PARALLELIZATION DEVICE, PROGRAM PARALLELIZATION METHOD, AND PROGRAM PARALLELIZATION PROGRAM

(75) Inventors: Atsufumi Shibayama, Tokyo (JP); Taku Osawa, Tokyo (JP); Satoshi Matsushita, Tokyo (JP)

(73) Assignee: NEC Corporation, Tokyo (JP)

( * ) Notice: Subject to any disclaimer, the term of this patent is extended or adjusted under 35 U.S.C. 154(b) by 1122 days.

(21) Appl. No.: 10/811,925

(22) Filed: Mar. 30, 2004

(65) Prior Publication Data

US 2004/0194074 A1    Sep. 30, 2004

(30) Foreign Application Priority Data

Mar. 31, 2003    (JP)    ............................. 2003-093076

(51) Int. Cl.
   *G06F 9/45*    (2006.01)
(52) U.S. Cl. ................................... 717/159
(58) Field of Classification Search ................ 717/161, 717/159, 157, 141–144; 712/244, 36, 32, 712/42; 713/324
   See application file for complete search history.

(56) References Cited

U.S. PATENT DOCUMENTS

| | | | |
|---|---|---|---|
| 4,977,582 A * | 12/1990 | Nichols et al. | ............... 375/371 |
| 5,579,494 A | 11/1996 | Zaiki | |
| 5,913,059 A | 6/1999 | Torii | |
| 6,389,446 B1 | 5/2002 | Torii | |
| 6,658,578 B1 * | 12/2003 | Laurenti et al. | ............. 713/324 |
| 2003/0014471 A1 | 1/2003 | Ohsawa et al. | |
| 2003/0014473 A1 | 1/2003 | Ohsawa et al. | |

FOREIGN PATENT DOCUMENTS

| | | |
|---|---|---|
| EP | 1 094 387 A3 | 4/2004 |
| JP | 10-027108 | 1/1998 |
| JP | 10-078880 | 3/1998 |
| JP | 2001-282549 | 10/2001 |
| JP | 2001-282549 A | 10/2001 |
| JP | 2003-029984 A | 1/2003 |
| JP | 2003-029985 | 1/2003 |
| JP | 2003-029985 A | 1/2003 |

OTHER PUBLICATIONS

Limits of PArallelism On Thread-Level Speculative Parallel Processing Architecture, Katsuhiko Metsugi et al, 6 pages, 2002.*

(Continued)

*Primary Examiner*—John Chavis
(74) *Attorney, Agent, or Firm*—Foley & Lardner LLP

(57) ABSTRACT

A control/data flow analysis unit analyzes the control flow and the data flow of a sequential processing program, and a fork point candidate determination unit determines fork point candidates taking this as the reference. A best fork point candidate combination determination unit determines the best fork point candidate combination by taking as the reference the result from the evaluation of the parallel execution performance of a test fork point candidate combination by a parallel execution performance evaluation unit, and a parallelized program output unit generates and outputs a parallelized program by inserting a fork command based on the best fork point candidate combination.

22 Claims, 24 Drawing Sheets

OTHER PUBLICATIONS

NEC and Pacific Internet: Providing the Business Case for the IP Promise, NEC 2 pages, no date.*

Modern Processor Design Fundementals of Superscalar Processors, John Paul Shen et al, Beta Edition, Oct. 9, 2002, Whole Book.*

S. Torii et al., "Proposal for On Chip Multiprocessor-oriented Control Parallel Architecture MUSCAT", Collection of Papers from the Parallel Processing Symposium JSPP97, (1997), pp. 229-236.

J. Sakai et al., "Automatic parallel compiling techniques for control parallel architecture," 1998 Parallel Processing Symposium Japan, Information Processing Society, Jun. 3, 1998, vol. 98:7, pp. 383-390.

J. Torii et al., "Proposal for the on-chip control parallel processor MUSCAT," Information Processing Society, Jun. 15, 1998, vol. 39:6, pp. 1622-1631.

* cited by examiner

FIG. 9

| FORK POINT CANDIDATE COMBINATION | PARALLEL EXECUTION PERFORMANCE (TIMES) |
|---|---|
| $\phi$ | 1.0 |
| {f0} | 2.5 |
| {f1} | 2.2 |
| {f2} | 2.4 |
| {f3} | 1.8 |
| {f0, f1} | 3.0 |
| {f0, f2} | 3.2 |
| {f0, f3} | 2.4 |
| {f1, f2} | 3.8 |
| {f1, f3} | 2.8 |
| {f2, f3} | 2.0 |
| {f0, f1, f2} | 3.5 |
| {f0, f1, f3} | 2.8 |
| {f0, f2, f3} | 2.5 |
| {f1, f2, f3} | 2.6 |
| {f0, f1, f2, f3} | 2.5 |

FIG. 10

INITIAL COMBINATION: {f0, f2} (PARALLEL EXECUTION PERFORMANCE: 3.2 TIMES)

| | SELECTED FORK POINT CANDIDATE | TEST COMBINATION | PARALLEL EXECUTION PERFORMANCE | BEST COMBINATION | SELECTED FORK POINT CANDIDATE |
|---|---|---|---|---|---|
| ITERATION 1-1 | f0 | {f2} | 2.4 | {f0, f2} | f0 |
| ITERATION 1-2 | f2 | {f0} | 2.5 | {f0, f2} | f0, f2 |
| ITERATION 1-3 | f1 | {f0, f1, f2} | 3.5 | {f0, f1, f2} | f0, f1, f2 |
| ITERATION 1-4 | f3 | {f0, f1, f2, f3} | 2.5 | {f0, f1, f2} | f0, f1, f2, f3 |
| ITERATION 2-1 | f0 | {f1, f2} | 3.8 | {f0, f1, f2} | f0 |
| ITERATION 2-2 | f2 | {f1} | 2.2 | {f1, f2} | f0, f2 |
| ITERATION 2-3 | f1 | {f2} | 2.4 | {f1, f2} | f0, f1, f2 |
| ITERATION 2-4 | f3 | {f1, f2, f3} | 2.6 | {f1, f2} | f0, f1, f2, f3 |
| ITERATION 3-1 | f0 | {f0, f1, f2} | 3.5 | {f1, f2} | f0 |
| ITERATION 3-2 | f2 | {f1} | 2.2 | {f1, f2} | f0, f2 |
| ITERATION 3-3 | f1 | {f2} | 2.4 | {f1, f2} | f0, f1, f2 |
| ITERATION 3-4 | f3 | {f1, f2, f3} | 2.6 | {f1, f2} | f0, f1, f2, f3 |

FIG. 13

INITIAL COMBINATION: {f0, f2} (PARALLEL EXECUTION PERFORMANCE: 3.2 TIMES)

| | SELECTED FORK POINT CANDIDATE | TEST COMBINATION | PARALLEL EXECUTION PERFORMANCE | BEST COMBINATION | SELECTED FORK POINT CANDIDATE |
|---|---|---|---|---|---|
| ITERATION 1-1 | f0 | {f2} | 2.4 | {f0, f2} | f0 |
| ITERATION 1-2 | f2 | {f0} | 2.5 | {f0, f2} | f0, f2 |
| ITERATION 1-3 | f1 | {f1, f2} | 3.8 | {f1, f2} | f0, f1, f2 |
| ITERATION 1-4 | f3 | {f1, f3} | 2.8 | {f1, f2} | f0, f1, f2, f3 |
| ITERATION 2-1 | f0 | {f0, f1, f2} | 3.5 | {f1, f2} | f0 |
| ITERATION 2-2 | f2 | {f1} | 2.2 | {f1, f2} | f0, f2 |
| ITERATION 2-3 | f1 | {f2} | 2.4 | {f1, f2} | f0, f1, f2 |
| ITERATION 2-4 | f3 | {f1, f3} | 2.8 | {f1, f2} | f0, f1, f2, f3 |

PROGRAM PARALLELIZATION DEVICE, PROGRAM PARALLELIZATION METHOD, AND PROGRAM PARALLELIZATION PROGRAM

BACKGROUNDS OF THE INVENTION

1. Field of the Invention

The present invention relates to a program conversion technique for a multithreading processor in which a plurality of processors execute a plurality of threads in parallel, and, more particularly, to a program parallelization device, a program parallelization method and a program parallelization program (compiler) for rapidly generating a parallelized program having high execution efficiency.

2. Description of the Related Art

One technique for processing single sequential processing programs in parallel with a parallel processor system is a multithreading method in which a program is divided into command streams called threads and executed in parallel by a plurality of processors (see, for example, Japanese Laid-open Patent (Kokai) No. Heisei 10-27108 (hereinafter referred to as Reference 1), Heisei 10-78880 (Reference 2) and 2003-029985 (Reference 3), and "Proposal for On Chip Multiprocessor-oriented Control Parallel Architecture MUSCAT" (Collection of Papers from the Parallel Processing Symposium JSPP97, Information Processing Society of Japan, pp. 229-236, May 1997) (Reference 4)). Conventional multithreading methods will be described below.

Typically, in the multithreading method, generating a new thread on another processor is called forking a thread, the thread that performed the fork operation is the parent thread, the newly generated thread is the child thread, the program location where the thread is forked is the fork point, and the program location at the beginning of the child thread is called the fork destination address or the start point of the child thread. In References 1-4, a fork command is inserted at the fork point to instruct the forking of a thread. The fork destination address is specified in the fork command, the child thread that starts at the fork destination address thereof by the execution of the fork command is generated on another processor, and the execution of the child thread is started. A program location where the processing of the thread is to be ended is called a terminal point, where each processor finishes processing the thread.

FIGS. 21, 22, 23 and 24 show overview of the processing in the multithreading method. FIG. 21 shows a sequential processing program divided into three threads A, B and C. When this program is processed with a single processor, one processor PE processes the threads A, B and C in turn as shown in FIG. 22. In contrast, in the multithreading methods in References 1-4, as shown in FIG. 23, a thread A is executed by one processor PE1, and, while the processor PE1 is executing the thread A, a thread B is generated on another processor PE2 by a fork command embedded in the thread A, and the thread B is executed by the processor PE2. Furthermore, the processor PE2 generates a thread C on the processor PE3 by a fork command embedded in the thread B. The processors PE1 and PE2 each finish processing the threads at the terminal points immediately before the start points of the threads B and C, and the processor PE 3 executes the last command of the thread C before executing the next command (usually a system call command). Thus, by simultaneously executing the threads in parallel with a plurality of processors, performance can be improved as compared with sequential processing.

There is another multithreading method, as shown in FIG. 24, in which forks are performed several times by the processor PE1, which is executing the thread A, to generate the thread B on the processor PE2, and the thread C on the processor PE3, respectively. In contrast to the model of FIG. 24, as shown in FIG. 23, a multithreading method constrained in such a way that a thread can generate a valid child thread at most once in its lifetime is called a one-time fork model. The one-time fork model substantially simplifies the management of threads, and achieves practical-scale hardware implementation of thread management. Furthermore, since for each processor the limit in terms of other processors on which it can generate a child thread is one processor, multithreading can be performed with a parallel processor system in which adjacent processors are connected unidirectionally in a ring form.

In order for a parent thread to generate a child thread and have the child thread perform a prescribed process, it is necessary that at least one register value from a register file at the fork point of the parent thread that is required by the child thread be delivered from the parent thread to the child thread. To reduce this cost of data delivery between threads, in References 2 and 4, a register value inheritance mechanism at thread generation time is provided through hardware, which copies the entire content in the register file of the parent thread to the child thread at thread generation time. After the child thread is generated, changes in the register values of the parent thread and the child thread are independent, and no passing of data using a register occurs between the threads. As another prior art for data delivery between threads, a parallel processor system has also been proposed, which has a mechanism for transferring register values separately on a register basis through a command.

Although the basics in multithreading methods are that the previous threads for which execution has been confirmed are executed in parallel, in actual programs, there are frequent cases where not enough threads are obtained, for which execution is confirmed. Furthermore, the percentage of parallelization is held down due to dynamically determined dependencies, limitation of analytical capabilities of the compiler and the like, raising the possibility that the desired performance may not be obtained. Thus, in Reference 1, control speculation is introduced to support speculative execution of threads through hardware. The control speculation speculatively executes threads with high possibility of execution before the execution is confirmed. The thread in a speculative state is temporarily executed to the extent that cancellation of execution is possible via hardware. A state in which the child thread performs temporary execution is called a temporary execution state, and when the child thread is in the temporary execution state, the parent thread is said to be in a temporary thread generation state. In the child thread in the temporary execution state, writing into shared memory and cache memory is restrained, and writing into an additionally provided temporary buffer is performed. When correctness of the speculation is confirmed, a speculation success notice is issued from the parent thread to the child thread, and the child thread reflects the content of the temporary buffer to the shared memory and the cache memory so as to be in a normal state without using the temporary buffer. In addition, the parent thread shifts from temporary thread generation state to thread generation state. On the other hand, if failure of the speculation is confirmed, a thread abort command is executed by the parent thread, and execution of the child and downstream threads is cancelled. In addition, the parent thread shifts from the temporary thread generation state to a non-thread generation state, such that generation of child thread is again possible. In other words, although generation of threads is limited to at most once in the one-time fork model, if control speculation is performed and the speculation fails, it is possible to fork again. Even in this case, at most one valid child thread is generated.

To achieve the multithreading of the one-time fork model in which a thread generates a valid child thread at most once in its lifetime, for example, in Reference 4 or the like, at the compilation step where a parallelized program is generated from a sequential processing program, the thread is limited to become a command code in which every thread executes a valid fork only once. That is to say, the one-time fork limitation is statically ensured in the parallelized program.

Meanwhile, in Reference 3, the one-time fork limitation is ensured at the time of execution of the program by selecting a fork command that generates a valid child thread among a plurality of fork commands present in the parent thread while the parent thread is executing.

Next, a conventional parallelized program generation device that is executed in the above-mentioned multithreading method will be described.

Referring to FIG. 25, in a conventional program parallelization device 10, a sequential processing program 13 is entered, a control/data flow analysis unit 11 analyzes the control flow and the data flow of the sequential processing program 13, then, based on the result, a fork insertion unit 12 divides a basic block or a plurality of basic blocks into units of parallelization, that is, threads, and inserts a fork command for parallelization to generate and output a parallelized program 14 divided into a plurality of threads.

The insertion point of the fork command (fork point) is determined so as to achieve higher parallel execution performance referring to the results of the analysis of the control flow and the data flow. However, sometimes the desired parallel execution performance cannot be achieved with the fork command insertion method based on static analysis due to the influence of program execution flow and memory dependencies that are only revealed at the time of program execution.

In contrast to this, a method is known, in which a fork point is determined with reference to profile information such as conditional branching probability and frequency of data dependency occurrence at the time of sequential execution (see, for example, Japanese Laid-open Patent (Kokai) No. 2001-282549 (hereinafter referred to as Reference 5)). According to this method, insertion of a more suitable fork command becomes possible by using the profile information that is dynamic information at the time of the sequential execution, thus, an improvement of parallel execution performance can be expected.

Incidentally, the above-mentioned prior arts have the following problems.

A first problem is that sometimes the desired parallel execution performance cannot be achieved even by executing conventional techniques owing to considerable room for improvement still present in the criteria for determining a fork point. The reason for this is that, while the criteria for determining a fork point is preferably the contribution of the fork command to the parallel execution performance, it is difficult to predict the performance at the time of the parallel execution accurately with an analytical method even if the profile information at the time of the sequential execution is used, such that sometimes a fork command may not be inserted appropriately.

One factor that makes analytically and highly accurately predicting the parallel execution performance difficult is the influence of memory dependence on the parallel execution performance. Since the influence of the memory dependence on the parallel execution performance varies intricately according to the parallelization scheme, even if the information on memory dependence is obtained from the profile information at the time of parallel execution, it is difficult to accurately evaluate its influence on the parallel execution performance. Furthermore, constraints of a parallelization method such as the one-time fork model, and hardware configuration such as inter-processor connection also have an influence on the parallel execution performance. However, similarly, since the influence on such parallel execution performance varies intricately according to the parallelization scheme, it is difficult to accurately evaluate the influence on the parallel execution performance from the profile information at the time of sequential execution with an analytical method.

Namely, there is the problem that, since it is difficult to accurately predict the parallel execution performance from the results of the analysis of the control flow and the data flow and the profile information obtained at the time of sequential execution, the fork command cannot be inserted appropriately, such that sometimes the desired parallel execution performance cannot be obtained.

A second problem is the longer time that is taken to determine the fork point, as attempts are made to obtain a fork point with a better parallel execution performance. The reason for this is that, in addition to the time taken to perform the evaluation becoming longer as the accuracy of the evaluation criteria for determining the fork point is improved, the number of fork points is usually high as compared with e.g., the number of loops contained in a program, thus the combination number thereof becomes enormous.

SUMMARY OF THE INVENTION

The present invention is proposed in consideration of such situations, and the objective thereof is to provide a program parallelization device, a program parallelization method and a program parallelization program for rapidly and highly accurately performing best fork point candidate combination determination processing to rapidly generate a parallelized program having higher parallel execution performance.

To achieve the above-mentioned objective, the program parallelization device, the program parallelization method and the program parallelization program of the present invention determine the best combination of fork point candidates by taking as references the results of the analysis of the control flow and data flow of a sequential processing program that are entered, the profile information obtained at the time of sequential execution, and the result of the direct evaluation of the parallel execution performance.

Specifically, According to the first aspect of the invention, a program parallelization device comprises a control/data flow analysis unit which analyzes the control flow and the data flow of a sequential processing program;

a fork point candidate determination unit which determines the fork point candidates of the sequential processing program by referring to the results of the analysis of the control flow and the data flow by the control/data flow analysis unit;

a parallel execution performance evaluation unit which evaluates, with respect to an input data, a parallel execution performance when the sequential processing program has been parallelized by a test combination of fork point candidates that were given;

a best fork point candidate combination determination unit which generates a test combination of the fork point candidates that were determined by the fork point candidate determination unit, provides the test combination to the parallel execution performance evaluation unit, and by taking the parallel execution performance of the test fork point candidate combination evaluated thereby as the reference, determines the best fork point candidate combination; and a parallelized program output unit which generates and outputs a parallelized program by inserting a fork command at each fork point candidate of the best combination determined by the best fork point candidate combination determination unit.

According to another aspect of the invention, a program parallelization device comprises a control/data flow analysis unit which analyzes the control flow and the data flow of a sequential processing program;

a fork point candidate determination unit which determines the fork point candidates of the sequential processing program by referring to the results of the analysis of the control flow and the data flow by the control/data flow analysis unit;

a parallel execution performance evaluation unit which evaluates, with respect to an input data, a parallel execution performance when the sequential processing program has been parallelized by a test combination of fork point candidates that were given;

a best fork point candidate combination determination unit which generates a test combination only consisting of the combination of fork point candidates that can be simultaneously executed in the one-time fork model from the fork point candidates determined by the fork point candidate determination unit, provides the test combination to the parallel execution performance evaluation unit, and by taking the parallel execution performance of the test fork point candidate combination evaluated thereby as the reference, determines the best fork point candidate combination;

a parallelized program output unit which generates and outputs a parallelized program by inserting a fork command at each fork point candidate of the best combination determined by the best fork point candidate combination determination unit.

According to another aspect of the invention, a program parallelization method for a multithreading method in which a sequential processing program is divided into a plurality of threads and a plurality of processors execute the threads in parallel, comprising the steps of analyzing the control flow and the data flow of a sequential processing program;

determining the fork point candidates of the sequential processing program by referring to the results of the analysis of the control flow and the data flow;

generating a test fork point candidate combination from the determined fork point candidates;

evaluating, with respect to an input data, the parallel execution performance when the sequential processing program has been parallelized by the generated test fork point candidate combination;

determining a best fork point candidate combination by taking the parallel execution performance of the evaluated test fork point candidate combination as the reference;

inserting a fork command at each fork point candidate in the determined best combination to generate and output a parallelized program.

According to another aspect of the invention, a program parallelization method for a multithreading method in which a sequential processing program is divided into a plurality of threads and a plurality of processors execute the threads in parallel, comprising the steps of analyzing the control flow and the data flow of a sequential processing program;

determining the fork point candidates of the sequential processing program by referring to the results of the analysis of the control flow and the data flow;

generating a test combination only consisting of the fork point candidates that can be simultaneously executed in the one-time fork model from the determined fork point candidates;

evaluating, with respect to an input data, the parallel execution performance when the sequential processing program has been parallelized by the generated test fork point candidate combination;

determining a best fork point candidate combination by taking the parallel execution performance of the evaluated test fork point candidate combination as the reference;

inserting a fork command at each fork point candidate in the determined best combination to generate and output a parallelized program.

According to another aspect of the invention, a program parallelization method for a multithreading method in which a sequential processing program is divided into a plurality of threads and a plurality of processors execute the threads in parallel, comprises a step in which a control/data flow analysis unit analyzes the control flow and the data flow of a sequential processing program;

a step in which a fork point candidate determination unit generates the fork point candidates by referring to the results of the analysis of the control flow and the data flow by the control/data flow analysis unit;

a step in which a best fork point candidate combination determination unit predicts the effect of each of all the fork point candidates on the parallel execution performance and ranks the fork point candidates in the order of the effect;

a step in which the best fork point candidate combination determination unit generates an initial fork point candidate combination whose parallel execution performance is evaluated first, and which is assumed to be the best fork point candidate combination;

a step in which a parallel execution performance evaluation unit generates a sequential execution trace when the sequential processing program was sequentially executed with the input data;

a step in which the parallel execution performance evaluation unit divides the sequential execution trace by taking all the terminal point candidates as division points a step in which the parallel execution performance evaluation unit analyzes thread element information for each thread element, and memorizes the thread element information for each thread element.

a step in which a best fork point candidate combination determination unit selects one fork point candidate that is ranked highest order among the non-selected fork point candidates;

a step in which the best fork point candidate combination determination unit assesses whether the fork point candidate selected is contained in the best fork point candidate combination;

a step in which, if the selected fork point candidate is not contained in the best fork point candidate combination, the best fork point candidate combination determination unit adds the selected fork point candidate to the best fork point candidate combination, and sets the fork point candidate combination as a test combination;

a step in which, if the selected fork point candidate is contained in the best fork point candidate combination, the best fork point candidate combination determination unit removes the selected fork point candidate from the best fork point candidate combination, and sets the fork point candidate combination as the test combination;

a step in which the best fork point candidate combination determination unit evaluates the parallel execution performance of parallelization by the test combination through the parallel execution performance evaluation unit;

a step in which the best fork point candidate combination determination unit compares the parallel execution performance of the test combination with the parallel execution performance of the best combination;

a step in which, if the parallel execution performance of the test combination is better, the best fork point candidate combination determination unit sets the test combination as the best fork point candidate combination at the current time;

a step in which the best fork point candidate combination determination unit assesses whether a fork point candidate that has not been selected exists, and if a fork point candidate that has not been selected exists, reiterates execution;

a step in which, if a non-selected fork point candidate does not exist, the best fork point candidate combination determination unit assesses whether a new best fork point candidate combination is found in the previous iterative execution;

a step in which, if a new best fork point candidate combination is found, the best fork point candidate combination determination unit sets all the fork point candidates to the non-selected state for the iterative execution;

a step in which, if a new best fork point candidate combination is not found, the best fork point candidate combination determination unit outputs the determined best fork point candidate combination as the result of the best fork point candidate combination determination processing; and a step in which a parallelized program output unit generates and outputs the parallelized program by inserting a fork command at each fork point candidate of the best combination determined by the best fork point candidate combination determination unit.

According to another aspect of the invention, a program parallelization method for a multithreading method in which a sequential processing program is divided into a plurality of threads and a plurality of processors execute the threads in parallel, comprises a step in which a control/data flow analysis unit analyzes the control flow and the data flow of a sequential processing program;

a step in which a fork point candidate determination unit generates the fork point candidates by referring to the results of the analysis of the control flow and the data flow by the control/data flow analysis unit;

a step in which a best fork point candidate combination determination unit predicts the effect of each of all the fork point candidates on the parallel execution performance and ranks the fork point candidates in the order of the effect;

a step in which the best fork point candidate combination determination unit generates an initial fork point candidate combination whose parallel execution performance is evaluated first, and which is assumed to be the best fork point candidate combination;

a step in which a parallel execution performance evaluation unit generates a sequential execution trace when the sequential processing program was sequentially executed with the input data;

a step in which the parallel execution performance evaluation unit divides the sequential execution trace by taking all the terminal point candidates as division points;

a step in which the parallel execution performance evaluation unit analyzes thread element information for each thread element, and memorizes the thread element information for each thread element;

a step in which a best fork point candidate combination determination unit selects one fork point candidate that is ranked highest order among the non-selected fork point candidates;

a step in which the best fork point candidate combination determination unit assesses whether the selected fork point candidate is contained in the best fork point candidate combination;

a step in which, if the selected fork point candidate is not contained in the best fork point candidate combination, the best fork point candidate combination determination unit adds the selected fork point candidate to the best fork point candidate combination, and sets the fork point candidate combination as a test combination;

a step in which the best fork point candidate combination determination unit removes the fork point candidate that cancels the selected fork point candidate from the test combination;

a step in which, if the selected fork point candidate is contained in the best fork point candidate combination, the best fork point candidate combination determination unit removes the selected fork point candidate from the best fork point candidate combination, and sets the fork point candidate combination as the test combination;

a step in which the best fork point candidate combination determination unit evaluates the parallel execution performance of parallelization by the test combination through the parallel execution performance evaluation unit;

a step in which the best fork point candidate combination determination unit compares the parallel execution performance of the test combination with the parallel execution performance of the best combination;

a step in which, if the parallel execution performance of the test combination is better, the best fork point candidate combination determination unit removes the fork point candidate that is canceled by the selected fork point candidate from the test combination;

a step in which the best fork point candidate combination determination unit sets the test combination as the best fork point candidate combination at the current time;

a step in which the best fork point candidate combination determination unit assesses whether a fork point candidate that has not been selected exists, and if a fork point candidate that has not been selected exists, reiterates execution;

a step in which, if a non-selected fork point candidate does not exist, the best fork point candidate combination determination unit assesses whether a new best fork point candidate combination is found in the previous iterative execution;

a step in which, if a new best fork point candidate combination is found, the best fork point candidate combination determination unit sets all the fork point candidates to the non-selected state for the iterative execution;

a step in which, if a new best fork point candidate combination is not found, the best fork point candidate combination determination unit outputs the determined best fork point candidate combination to the parallelized program output unit as the result of the best fork point candidate combination determination processing; and a step in which the parallelized program output unit generates and outputs the parallelized program by inserting a fork command at each fork point candidate of the best combination determined by the best fork point candidate combination determination unit.

According to another aspect of the invention, a program parallelization program that is executed on a computer causing, a computer to operate as a control/data flow analysis function which analyzes the control flow and the data flow of a sequential processing program;

a fork point candidate determination function which determines the fork point candidates of the sequential processing program by referring to the results of the analysis of the control flow and the data flow by the control/data flow analysis function;

a parallel execution performance evaluation function which evaluates, with respect to an input data, a parallel execution performance when the sequential processing program has been parallelized by a test combination of fork point candidates that were given;

a best fork point candidate combination determination function which generates a test combination of the fork point candidates that were determined by the fork point candidate determination function, provides the test combination to the parallel execution performance evaluation function, and by taking the parallel execution performance of the test fork point candidate combination evaluated thereby as the reference determines the best fork point candidate combination; and a parallelized program output function which generates and outputs a parallelized program by inserting a fork command at each fork point candidate of the best combination determined by the best fork point candidate combination determination function.

According to another aspect of the invention, a program parallelization program that is executed on a computer causing, a computer to operate as a control/data flow analysis function which analyzes the control flow and the data flow of a sequential processing program;

a fork point candidate determination function which determines the fork point candidates of the sequential processing program by referring to the results of the analysis of the control flow and the data flow by the control/data flow analysis function;

a parallel execution performance evaluation function which evaluates, with respect to an input data, a parallel execution performance when the sequential processing program has been parallelized by a test combination of fork point candidates that were given;

a best fork point candidate combination determination function which generates a test combination only consisting of the combination of fork point candidates that can be simultaneously executed in the one-time fork model from the fork point candidates determined by the fork point candidate determination function, provides the test combination to the parallel execution performance evaluation function, and by taking the parallel execution performance of the test fork point candidate combination evaluated thereby as the reference, determines the best fork point candidate combination;

a parallelized program output function which generates and outputs a parallelized program by inserting a fork command at each fork point candidate of the best combination determined by the best fork point candidate combination determination function.

According to the present invention, since parallel execution performance is directly evaluated with respect to the test fork point candidate combination and the best fork point candidate combination is determined by taking this as the reference, the fork command can be appropriately inserted by the sequential processing program, allowing a parallelized program having higher parallel execution performance to be obtained.

Furthermore, according to the present invention, a better combination is constructed by ranking the fork point candidates in the order in which they are predicted to have an influence on parallel execution performance, and evaluating the parallel execution performance according to this order by taking the best fork point candidate combination at that time as the reference; therefore, the invention has the effect of allowing the processing time for the best fork point candidate combination determination processing to be substantially shortened as compared with a case where all the combinations of fork point candidates are evaluated.

Furthermore, according to the present invention, since the parallel execution performance is evaluated only with respect to the test combinations in which the fork point candidates can be executed simultaneously if a one-time fork model is adopted as a multithreading method, the invention has the effect of allowing the processing time for the best fork point candidate combination determination processing to be shortened.

Moreover, according to the present invention, since the fork point candidates are divided into the appropriate number of groups so as to minimize the mutual influence between the groups to perform the best fork point candidate combination determination processing independently for each group, the total number of the combinations of the fork point candidates can be reduced, thus, the invention has the effect of allowing the best fork point candidate combination determination processing to be performed rapidly even if the number of fork point candidates is large.

Moreover, according to the present invention, since parallel execution is simulated by units of thread element that are determined by the terminal point candidates, the parallel execution performance can be evaluated rapidly, thus, the invention has the effect of allowing the best fork point candidate combination determination processing to be performed rapidly.

Instances will be described with reference to FIGS. 3, 4, 5, 6, 7 and 8. FIGS. 3-8 show overview of multithreading by a one-time fork model on a parallel processor system in which adjacent processors are connected unidirectionally in a ring form. FIG. 3 shows the sequential execution trace of a sequential processing program in which three threads An, Bn and Cn (n=..., 1, 2 3, ...) are iteratively executed. Here, a fork point candidate f0 having the beginning of a thread An as the fork point and the end of the thread An as the fork destination, a fork point candidate f1 having the beginning of a thread Bn as the fork point and the end of the thread Bn as the fork destination, and a fork point candidate f2 having the beginning of a thread Bn as the fork point and the end of the thread Cn as the fork destination, are assumed as fork point candidates.

There are 8 combinations of the three fork point candidates f0, f1 and f2: φ (no fork), {f0}, {f1}, {f2}, {f0, f1}, {f0, f2}, {f1, f2} and {f0, f1, f2}. The best fork point candidate combination determination processing is simply a selection of the combination that shows a better parallel execution performance among the combinations of fork point candidates. Assuming that data dependency is not broken regardless of the fork point candidate combination that is selected, FIG. 4 shows the state of parallel execution by {f0} (the fork command is inserted only in the fork point candidate f0). Similarly, FIG. 5 shows the parallel execution by {f1}, FIG. 6 shows the parallel execution by {f2}, FIG. 7 shows the parallel execution by {f0, f1} and FIG. 8 shows the parallel execution by {f0, f2}.

Since it is now assumed that the one-time fork model is used, the fork point candidates f1 and f2 cannot be executed simultaneously, such that {f1, f2} and {f0, f1, f2} cannot be executed in parallel as is. Thus, either the insertion of at most one of them at the time of parallelized code generation must be ensured, as shown in Reference 4 or the like, or only one of them has to be selected and executed at the time of execution, as shown in Reference 3.

Taking the case of sequential execution shown in FIG. 3 as a reference, since parallelization by {f0} in FIG. 4 provides 1.33 times throughput, a parallel execution performance of 1.33 times higher than the sequential execution performance is achieved. That is, the program execution is 1.33 times faster than the sequential execution. Similarly, parallelization by {f1} in FIG. 5 achieves a parallel execution performance of 2.67 times, parallelization by {f2} in FIG. 6 achieves a parallel execution performance of 4 times, parallelization by {f0, f1} in FIG. 7 achieves a parallel execution performance of 3.2 times, and parallelization by {f0, f2} in FIG. 8 achieves a parallel execution performance of 2.67 times. That is, in the present instance, the fork point candidate f2 on its own demonstrates a better parallel execution performance than, for example, combining the fork point candidate f0 and the fork point candidate f1 or f2. This is also under considerable influenced by the one-time fork limitation and the hardware configuration in which processors are connected unidirectionally in a ring form, and in a situation where data dependency is violated, more complex aspects are exhibited. Thus, it is difficult to predict such parallel execution performance only from the results of the analysis of the control flow and the data flow of the sequential processing program and the profile information obtained at the time of sequential execution. Thus, in contrast to a conventional parallelization method in which sometimes the desired parallel execution performance could not be obtained, according to the present invention, since the parallel execution performance is directly evaluated and the best fork point candidate combination is determined by taking this as the reference, the fork command can be appropriately inserted by a sequential processing program, allowing a parallelized program having a higher parallel execution performance to be obtained.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 9 is a diagram illustrating an instance of the best fork point candidate combination determination processing in accordance with the first embodiment;

FIG. 10 is a diagram illustrating an instance of the best fork point candidate combination determination processing in accordance with the first embodiment;

FIG. 13 is a diagram illustrating an instance of the best fork point candidate combination determination processing in accordance with the second embodiment;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

In the following, the embodiments of the present invention will be described in detail with reference to drawings.

First Embodiment

Figure 1:
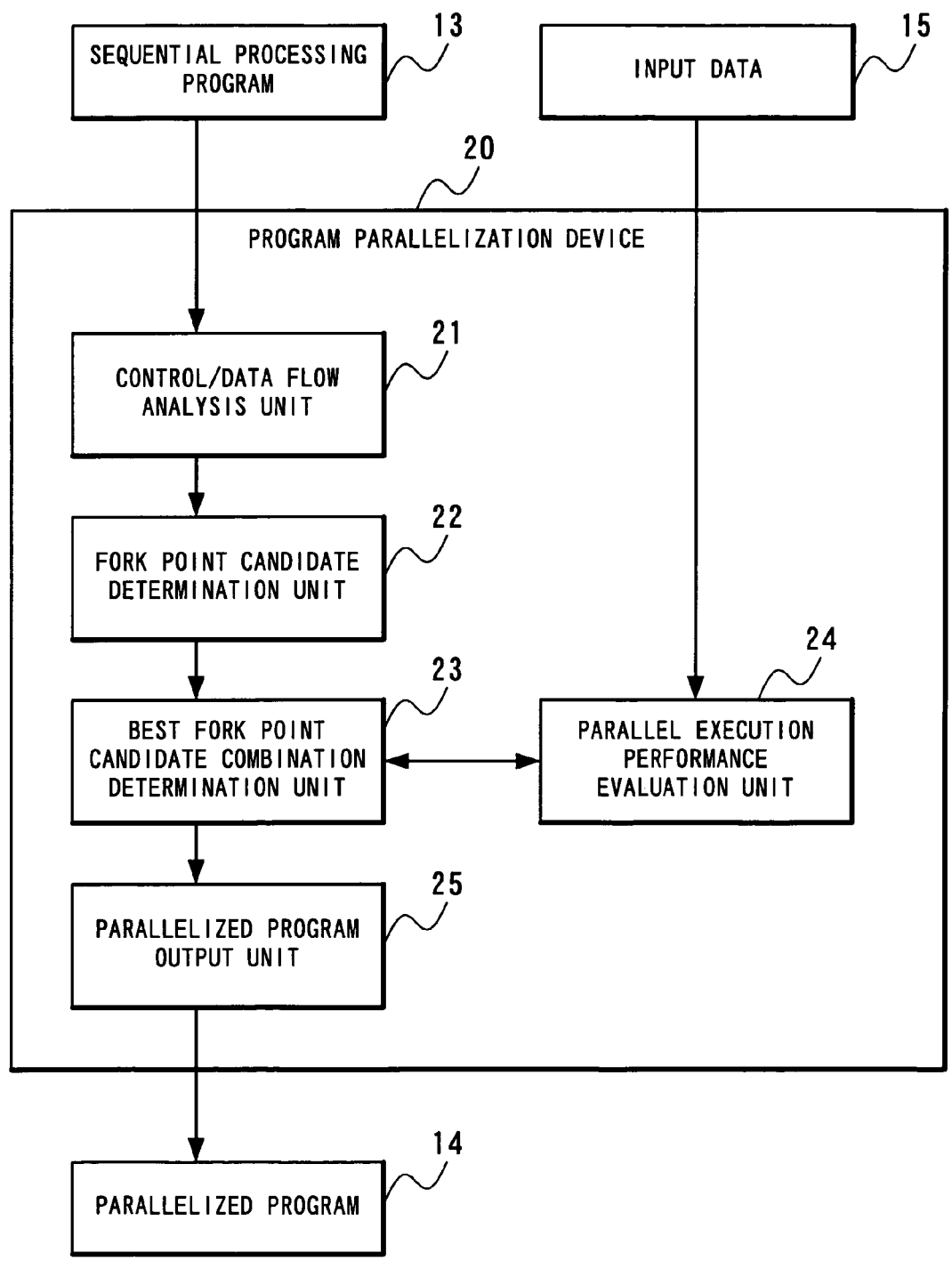
FIG. 1 is a block diagram illustrating the configuration of a program parallelization device in accordance with a first embodiment of the present invention.

Referring to FIG. 1, a program parallelization device 20 related to a first embodiment of the present invention comprises a control/data flow analysis unit 21 that analyzes the control flow and the data flow of a sequential processing program 13 that is entered, a fork point candidate determination unit 22 that determines the fork point candidates of the sequential processing program 13 by referring to the results of the analysis of the control flow and data flow of the control/data flow analysis unit 21, a best fork point candidate combination determination unit 23 that generates a test combination of the fork point candidates that were determined by the fork point candidate determination unit 22 and determines the best fork point candidate combination by referring to the result of the evaluation of parallel execution performance of the test combination by a parallel execution performance evaluation unit 24, the parallel execution performance evaluation unit 24 that evaluates the parallel execution performance with respect to input data 15 when the sequential processing program 13 is parallelized by the test fork point candidate combination obtained from the best fork point candidate combination determination unit 23, and a parallelized program output unit 25 that generates and outputs a parallelized program 14 based on the best fork point candidate combination determined by the best fork point candidate combination determination unit 23.

Figure 2:
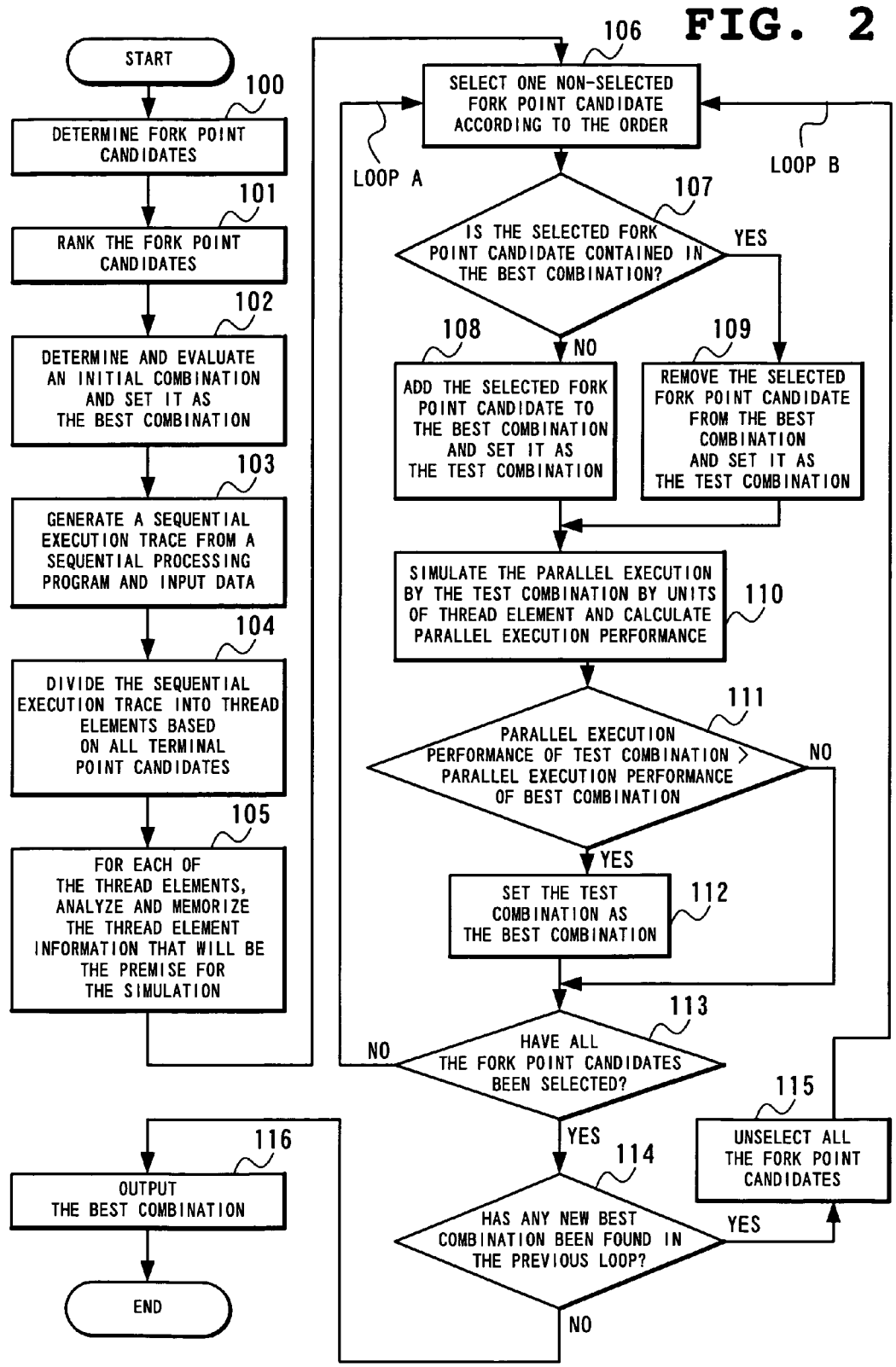
FIG. 2 is a flow chart illustrating the best fork point candidate combination determination processing in accordance with the first embodiment of the present invention.

Referring to FIG. 2, best fork point candidate combination determination processing by the fork point candidate determination unit 22, the best fork point candidate combination determination unit 23 and the parallel execution performance evaluation unit 24 comprises a fork point candidate generation step 100, a fork point candidate ranking step 101, an initial fork point candidate combination generation step 102, a sequential execution trace generation step 103, a thread element division step 104, a thread element information analysis/memorization step 105, a fork point candidate selection step 106, a best fork point candidate combination assessment step 107, a fork point candidate insertion/test combination setting step 108, a fork point candidate removal/test combination setting step 109, a parallel execution performance calculation step 110, a parallel execution performance comparison step 111, a best combination setting step 112, an all fork point candidate selection assessment step 113, a new best combination discovery assessment step 114, an all fork point candidate non-selection setting step 115 and a best combination output step 116.

Next, the operation of the program parallelization device 20 related to the first embodiment constituted in such a manner will be described.

In particular, the best fork point candidate combination determination processing that is processed by the fork point candidate determination unit 22, the best fork point candidate combination determination unit 23 and the parallel execution performance evaluation unit 24 will be described in detail, referring to FIG. 2.

First, the control/data flow analysis unit 21 analyzes the control flow and the data flow of the sequential processing program 13.

Next, the fork point candidate determination unit 22 generates the fork point candidates by referring to the results of the analysis of the control flow and the data flow by the control/data flow analysis unit 21 (Step 100). Specifically, the fork point candidate is generated by analyzing the control flow to extract the basic block of the sequential processing program 13 so as to perform parallelization using the basic block or a plurality of basic blocks as a unit. At this time, for example, in the multithreading method disclosed in References 2 and 4 in which a register value is inherited by a child thread at thread generation time, and passing of data using a register between a parent thread and the child thread does not occur after the child thread has been generated, a fork may be performed at any point where the content of the register is the same on a data flow, which may be a fork point candidate. Further, according to guidelines disclosed in Reference 4 (Section 4.1), the fork point candidate predicted to be effective with respect to parallel execution performance by referring to the control flow and the data flow may preliminarily be narrowed down to some extent.

Next, the best fork point candidate combination determination unit 23 predicts the effect of each of all the fork point candidates on the parallel execution performance and ranks the fork point candidates in the order of the effects (Step 101). For the prediction of the effect, for example, by referring to the result of a sequential execution trace at the time of sequential execution, the effect may be predicted by referring to the number of execution cycles from a fork point to a fork destination of the fork point candidate subjected to the prediction or the number of occurrences of the fork point candidate, or the effect may be determined by evaluating the parallel execution performance when each fork point candidate is individually executed in parallel, with the parallel execution performance evaluation unit 24.

Then, the best fork point candidate combination determination unit 23 generates a fork point candidate combination whose parallel execution performance is evaluated first (initial combination), and which is assumed to be the best fork point candidate combination (Step 102). This can be achieved for instance by assuming that the initial combination is the fork point candidate combination that includes a prescribed number of fork point candidates from the top of the fork point candidate order that was determined at Step 101, evaluating the parallel execution performance of the initial combination with the parallel execution performance evaluation unit 24, and assuming the initial combination to be the best fork point candidate combination at this time.

Next, the parallel execution performance evaluation unit 24 first generates the sequential execution trace when the sequential processing program 13 was sequentially executed with the input data 15 (Step 103).

The parallel execution performance evaluation unit 24 then divides the sequential execution trace by taking all the terminal point candidates as division points (Step 104). Each partial execution trace arising from the division is called a thread element. A terminal point candidate can be determined given the fork point candidate. For example, in the multithreading method disclosed in Reference 3 in which a processor that has generated a valid child thread completes execution up to the command of an address immediately preceding the initial address of the valid child thread (see claim 1, Paragraph 0013 and the like in Reference 3), the terminal point being equal to the fork destination of the fork command, the terminal point candidate is uniquely determined given the fork point candidate.

Next, the parallel execution performance evaluation unit 24 analyzes thread element information such as the number of execution cycles for each thread element, the fork point candidate that occurs within the thread element and the occurrence location thereof, the thread element of the fork destination and memory dependency between the thread elements, which are memorized for each thread element (Step 105).

Figure 3:
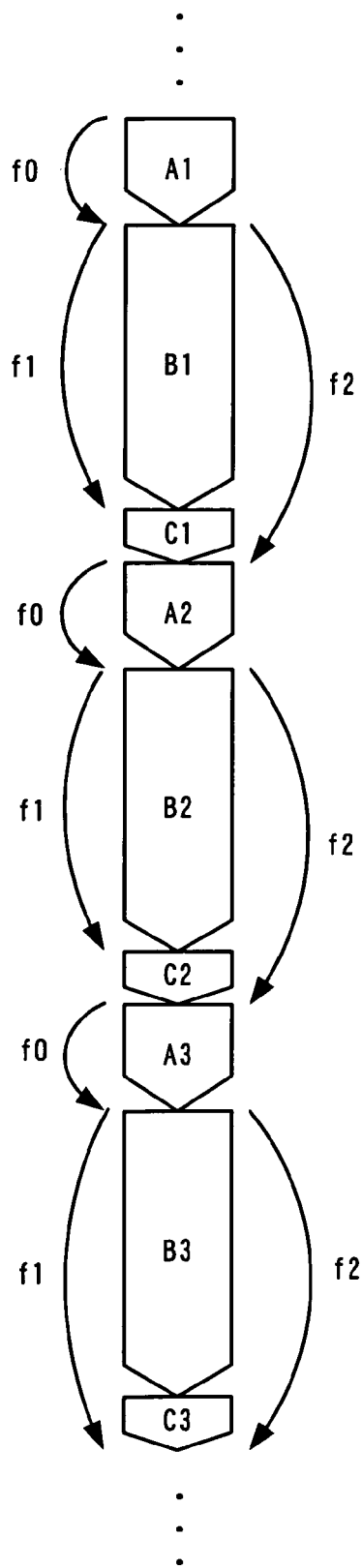
FIG. 3 is a diagram illustrating an example of a multi-threading method in the one-time fork model.

For example, referring to FIG. 3, the sequential execution trace can be divided into thread elements An, Bn and Cn with the fork point candidates f0, f1 and f2. The thread element An and the thread element Bn are determined by the terminal point of the fork point candidate f0, the thread element Bn and the thread element Cn are determined by the terminal point of the fork point candidate f1, and the thread element Cn and the thread element An are determined by the terminal point of the fork point candidate f2.

Figure 4:
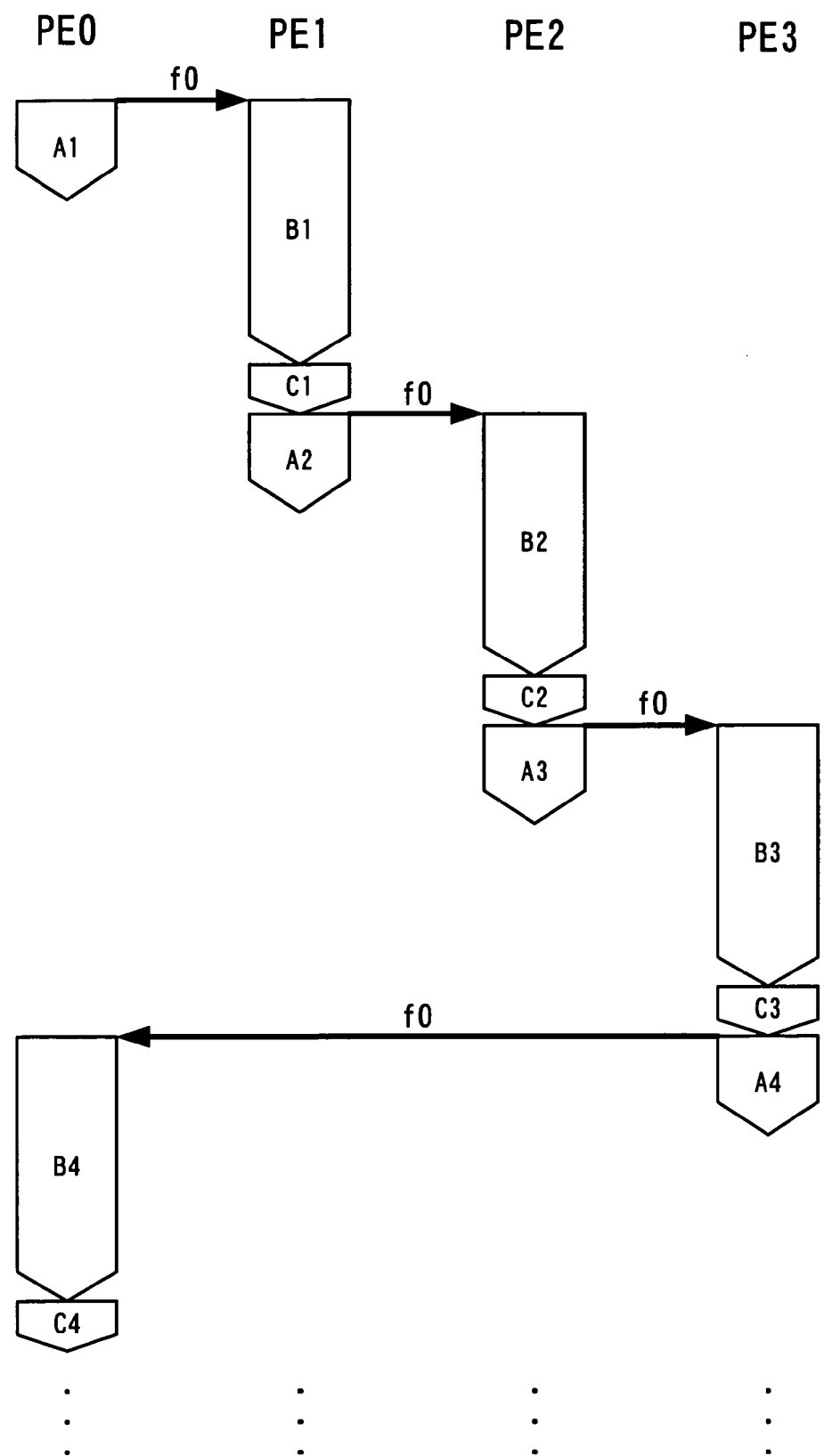
FIG. 4 is a diagram illustrating an example of a multi-threading method in the one-time fork model.
Figure 5:
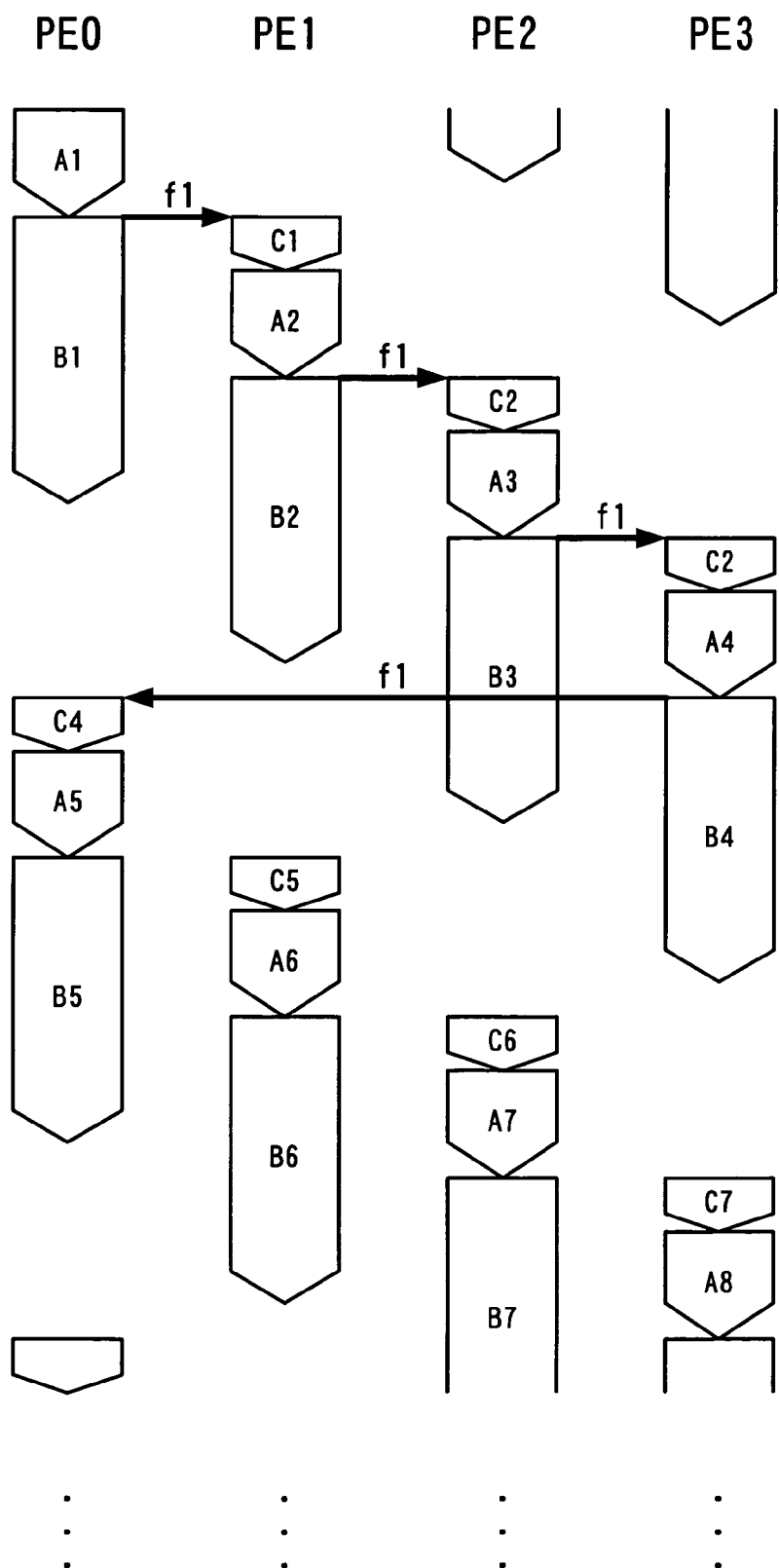
FIG. 5 is a diagram illustrating an example of a multi-threading method in the one-time fork model.
Figure 6:
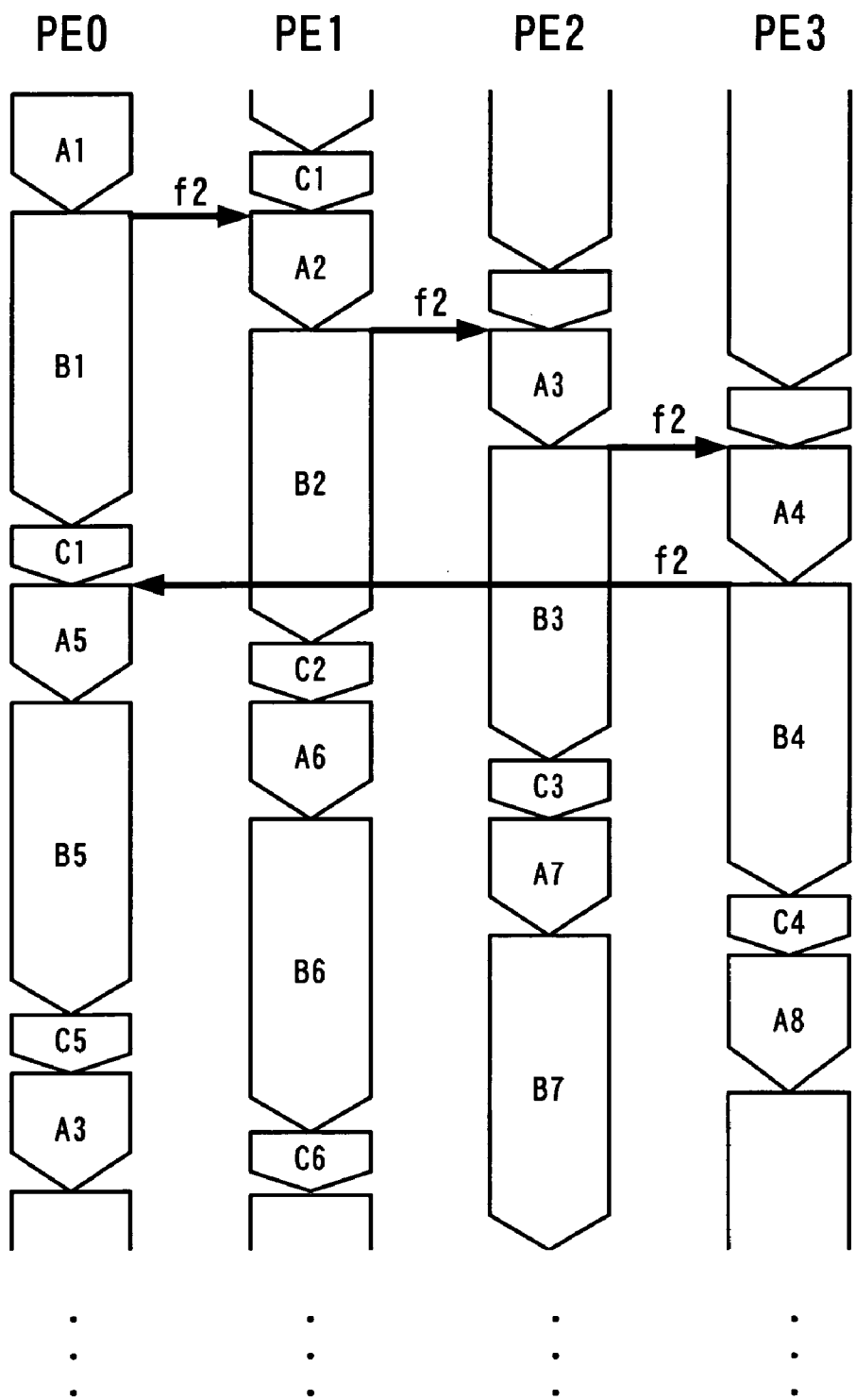
FIG. 6 is a diagram illustrating an example of a multi-threading method in the one-time fork model.
Figure 7:
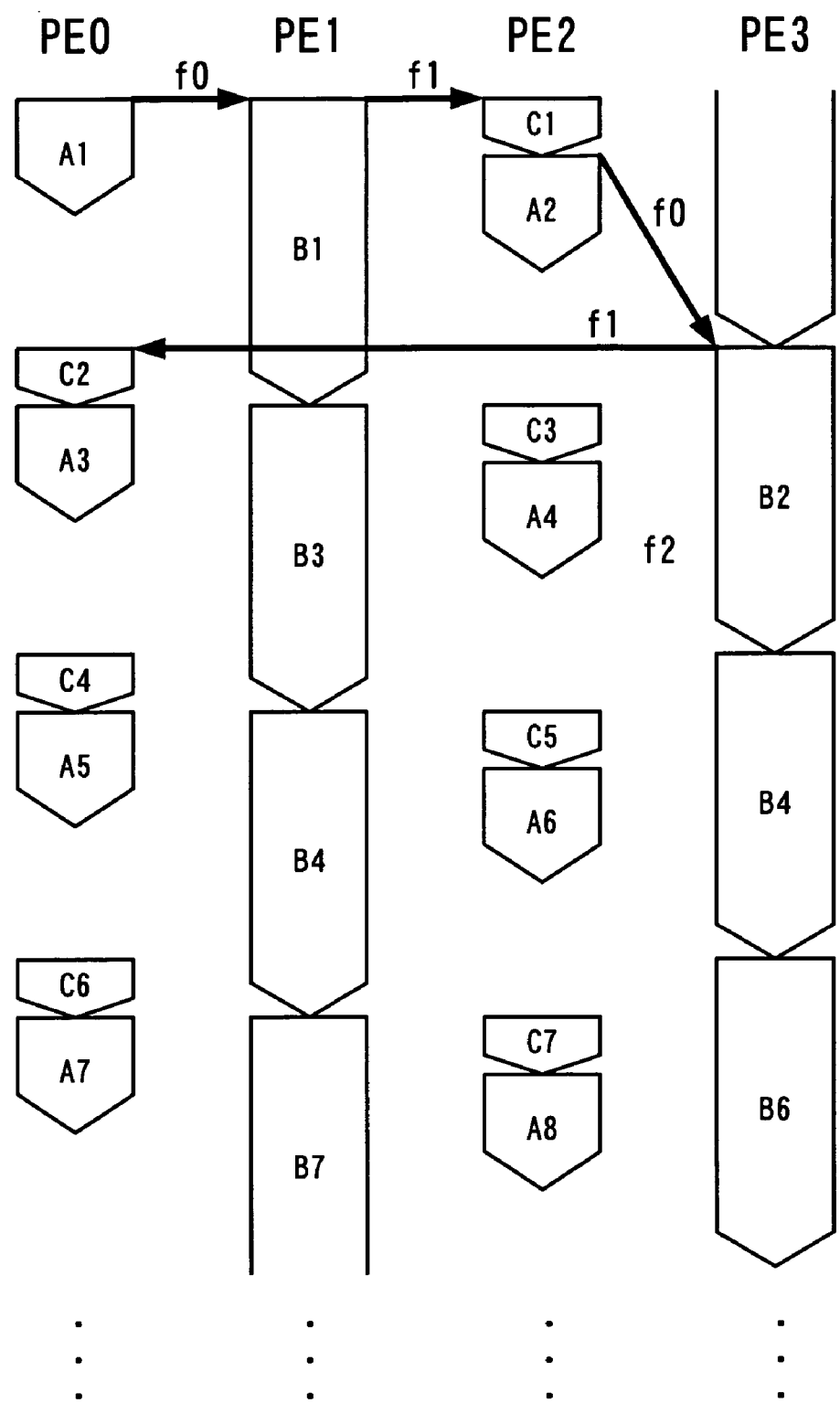
FIG. 7 is a diagram illustrating an example of a multi-threading method in the one-time fork model.
Figure 8:
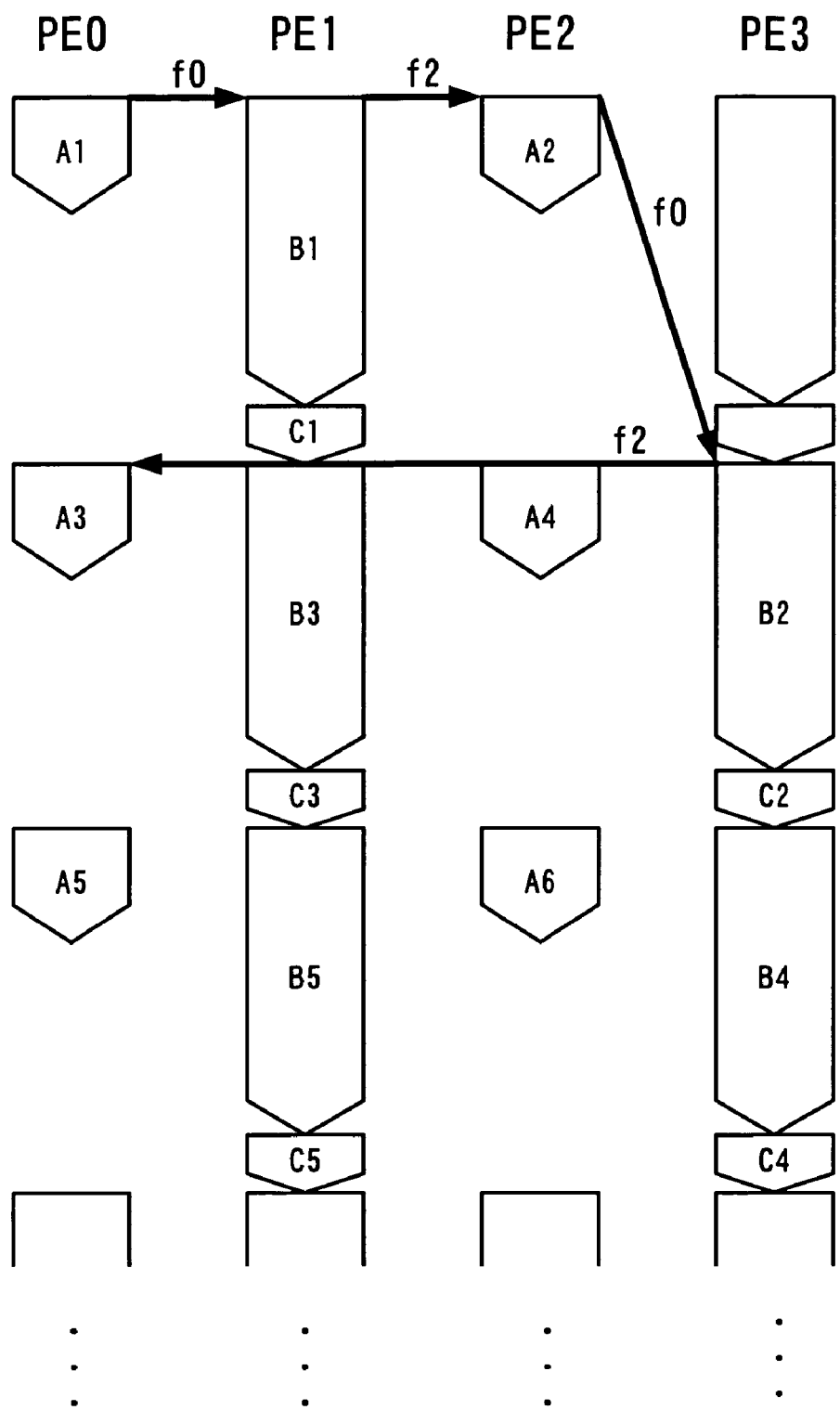
FIG. 8 is a diagram illustrating an example of a multi-threading method in the one-time fork model.

All the threads generable by the fork point candidates f0, f1 and f2 are constituted by the combination of thread elements An, Bn and Cn. For example, the threads generated by the fork point candidate f0 shown in FIG. 4 are constituted by the thread elements arranged in the Bn, Cn, An order. Similarly, all the threads in the parallelization through other fork point candidate combinations shown in FIGS. 5, 6, 7 and 8 are also constituted by the combination of the thread elements An, Bn and Cn. This means that, given the fork point candidate, the parallel execution by the given fork point candidate can be simulated by units of thread element that are determined at the terminal point of the fork point candidate. However, in order to determine the start location of each thread (location where the fork within the thread is executed) and detect data dependency, an analysis of the sequential execution trace by units of command is needed. In the embodiment, with respect to the given sequential processing program 13 and the input data 15, thread information such as the number of execution cycles for each thread element, the fork point candidate that occurs within the thread element and the occurrence location thereof, the thread element of the fork destination and the memory dependency between the thread elements is analyzed only once, and the thread information is memorized for each thread element. Since analysis by units of command is unnecessary in the processing that actually simulates parallel execution, the characteristics is a high evaluation speed when the parallel execution performance is iteratively evaluated.

The best fork point candidate combination determination unit 23 then selects one fork point candidate that is ranked highest among the non-selected fork point candidates, while a loop A comprised of Steps 106-113 is iteratively executed (Step 106).

Next, the best fork point candidate combination determination unit 23 assesses whether the fork point candidate selected at Step 106 is contained in the best fork point candidate combination (Step 107).

If the selected fork point candidate is not contained in the best fork point candidate combination, the best fork point candidate combination determination unit 23 adds the fork point candidate selected at Step 106 to the best fork point candidate combination, and the fork point candidate combination is assumed to be a test combination (Step 108).

On the other hand, if the selected fork point candidate is contained in the best fork point candidate combination, the best fork point candidate combination determination unit 23 removes the fork point candidate selected at Step 106 from the best fork point candidate combination, and the fork point candidate combination is assumed to be a test combination (Step 109).

Next, the best fork point candidate combination determination unit 23 evaluates the parallel execution performance of parallelization by the test combination through the parallel execution performance evaluation unit 24 (Step 110).

As methods of parallel execution performance evaluation by the parallel execution performance evaluation unit 24, a method in which the actual execution is performed on a multiprocessor system for evaluation, and a method in which parallel execution is simulated on a multiprocessor system simulator (not shown) for evaluation, more specifically, methods that assume that the sequential processing program 13 has been parallelized by the test fork point candidate combination whose parallel execution performance is to be evaluated, the operation at this time is virtually executed on the simulator to evaluate the performance thereof, may be cited. Further, although the number of execution cycles and the execution time during parallel execution are suitable as indicators of parallel execution performance, processor capacity utilization may be added at this time to computation of the evaluation result in order to consider power consumption. In the first embodiment, the parallel execution performance evaluation unit 24 evaluates the parallel execution performance with respect to the test combination of the given fork point candidates by simulating parallel execution by units of thread element that have been determined by the terminal point candidate by referring to the thread element information memorized at Step 105.

Specifically, first, the parallel execution performance evaluation unit 24 refers to the test fork point candidate combination whose parallel execution performance is to be evaluated and the thread element information of the fork point candidate (fork point candidate occurring within the thread element and the thread element of the fork destination) that is memorized for each thread element, determines the terminal point of its own thread and combines the thread elements to generate its own thread. Next, the parallel execution performance evaluation unit 24 refers to the thread element information of the fork point candidate (occurrence location where the fork point candidate occurs within the thread element) and the processor usage status, and determines the execution start point of a child thread generated by the fork candidate. The parallel execution performance evaluation unit 24 then refers to the thread element information of the fork point candidate (information in the memory dependency between thread elements) that is memorized for each thread element to assess the correctness of the speculative execution with respect to the memory dependency between the thread elements, and, if the execution is cancelled, this is reflected in the execution start point of the thread.

According to the parallel execution performance evaluation unit 24, pre-performing Steps 104 and 105 only once with respect to a sequential execution trace and terminal point candidates is sufficient, and in case the test fork point candidate combination whose parallel execution performance is to be evaluated is given iteratively similarly to the best fork point candidate combination determination processing, performing Step 106 onward is sufficient. Thus, a characteristics is the high speed of evaluation in contrast to, for example, a conventional parallel execution simulation in which simulation of parallelization and memory dependency is performed at each evaluation by units of command. Further, since evaluation methods that actually perform parallel execution on a multiprocessor also has disadvantages such as evaluation cannot be performed without a multiprocessor that is actually running, and the presence of overhead to convert the test combination to be evaluated into a parallelized program 14 executed by the multiprocessor to obtain the evaluation result, the evaluation of the parallel execution performance in accordance with the present invention is more often effective for accelerating the evaluation processing.

The best fork point candidate combination determination unit 23 then compares the parallel execution performance of the test combination with the parallel execution performance of the best combination (Step 111).

If the parallel execution performance of the test combination is better, the best fork point candidate combination determination unit 23 sets the test combination as the best fork point candidate combination at the current time (Step 112). If the parallel execution performance of the test combination is worse, the best fork point candidate combination determination unit skips Step 112.

Next, the best fork point candidate combination determination unit 23 assesses whether a fork point candidate that has not been selected in the iterative execution of the loop A exists (Step 113). If a non-selected fork point candidate exists, the control is returned to Step 106 and iteratively executed as the loop A.

If a non-selected fork point candidate does not exist, that is, if all the fork point candidates have been selected, the best fork point candidate combination determination unit 23 assesses whether a new best fork point candidate combination is found in the previous iterative execution of the loop A (Step 114).

If a new fork point candidate combination is found, the best fork point candidate combination determination unit 23 sets all the fork point candidates to the non-selected state for the iterative execution of the loop A (Step 115), the control is returned to Step 106 and iteratively executed as loop B.

If a new best fork point candidate combination is not found, the best fork point candidate combination determination unit 23 outputs the determined best fork point candidate combination to the parallelized program output unit 25 as the result of the best fork point candidate combination determination processing (Step 116).

Finally, the parallelized program output unit 25 generates and outputs the parallelized program 14 by inserting a fork command at each fork point candidate of the best combination determined by the best fork point candidate combination determination unit 23.

As described above, according to the first embodiment, since parallel execution performance is directly evaluated with respect to the test fork point candidate combination and the best fork point candidate combination is determined by taking this as the reference, a fork command can be appropriately inserted by the sequential processing program 13, allowing the parallelized program 14 having higher parallel execution performance to be obtained.

Further, since a better combination is constructed by ranking the fork point candidates in the order in which they are predicted to have an influence on the parallel execution performance, and according to the order, evaluating the parallel execution performance by taking the best fork point candidate combination at that time as the reference, an effect is to allow the processing time for the best fork point candidate combination determination processing to be substantially shortened compared with the case when all the fork point candidate combinations are evaluated.

Instance of First Embodiment

Referring to FIGS. 9 and 10, an instance of the best fork point candidate combination determination processing in the program parallelization device 20 according to the first embodiment will be described.

Assumed here are f0, f1, f2 and f3 as fork point candidates. The total number of the fork point candidate combinations at this time is 16, including the case of a sequential execution with no forking at all (φ).

How many times the performance of the sequential execution performance (in the φ case) is achieved by parallel execution is used as an indicator of the parallel exaction performance. Each parallel execution performance of the 16 fork point candidate combinations is assumed as shown in FIG. 9. In this case, the parallel execution performance when f1 and f2 are selected as the fork point candidates is the highest, which is a performance of 3.8 times the sequential execution.

Since there are 16 fork point candidate combinations, in a method in which the parallel execution performance of all the combinations is evaluated to determine the best fork point candidate combination, the evaluation of the parallel execution performance has to be performed 16 times.

Next, the details of the operation of the best fork point candidate combination determination processing in accordance with the first embodiment with respect to the instance shown in FIG. 9 will be described also referring to the flow chart in FIG. 2.

First, in Step 100, it is assumed that f0, f1, f2 and f3 have been obtained as fork point candidates.

Next, the fork point candidates are ranked in Step 101. At this time, the ranking is performed in the order in which the parallel execution performance is highest taking as the indicator the parallel execution performance when each fork point candidate is individually parallelly executed. Referring to each parallel execution performance shown in FIG. 9, the order is f0, f2, f1 and f3.

Then, an initial combination is generated in Step 102. Two from the top of the fork point candidate order determined in Step 101 are used in the initial combination to give the initial combination {f0, f2}. The parallel execution performance of {f0, f2} is evaluated to yield 3.2 as the result thereof. {f0, f2} becomes the best fork point candidate combination at this time.

Next, the loops A and B are iteratively executed from Step 106. The state of the operation for each iteration is shown in FIG. 10.

First Execution of Loop A, First Execution of Loop B (Iteration 1-1)

First, in the execution of the loop A, the highest ranked fork point candidate is selected from the non-selected fork point candidates (Step 106). At this time, since all the fork point candidates are unselected, the fork point candidate f0 is selected. Since the fork point candidate f0 is contained in the best fork point candidate combination {f0, f2} (Step 107), the fork point candidate f0 is removed from the best fork point candidate combination {f0, f2}, so that the test combination becomes {f2} (Step 109). Next, the parallel execution performance of the test combination is evaluated to yield 2.4 as the result thereof (Step 110). Since the parallel execution performance of the test combination (2.4) is worse than the parallel execution performance of the best fork point candidate combination (3.2) (Step 111), the best fork point candidate combination is still {f0, f2}. Since non-selected fork point candidates are remaining in the loop A (Step 113), a second execution of the loop A is started from Step 106.

Second Execution of Loop A, First Execution of Loop B (Iteration 1-2)

Similarly, in the execution of the loop A, the highest ranked fork point candidate is selected from the non-selected fork point candidates (Step 106). At this time, since the fork point candidate f0 has already been selected, the fork point candidate f2 is selected. Since the fork point candidate f2 is contained in the best fork point candidate combination {f0, f2} (Step 107), the fork point candidate f2 is removed from the best fork point candidate combination {f0, f2}, so that the test combination becomes {f0} (Step 109). Next, the parallel execution performance of the test combination is evaluated to yield 2.5 as the result thereof (Step 110). Since the parallel execution performance of the test combination (2.5) is worse than the parallel execution performance of the best fork point candidate combination (3.2) (Step 111), the best fork point candidate combination is still {f0, f2}. Since non-selected fork point candidates are remaining in the loop A (Step 113), a third execution of the loop A is started from Step 106.

Third Execution of Loop A, First Execution of Loop B (Iteration 1-3)

Similarly, in the execution of the loop A, the highest ranked fork point candidate is selected from the non-selected fork point candidates (Step 106). At this time, since the fork point candidates f0 and f2 have already been selected, the fork point candidate f1 is selected. Since the fork point candidate f1 is not contained in the best fork point candidate combination {f0, f2} (Step 107), the fork point candidate f1 is added to the best fork point candidate combination {f0, f2}, so that the test combination becomes {f0, f1, f2} (Step 108). Next, the parallel execution performance of the test combination is evaluated to yield 3.5 as the result thereof (Step 110). Since the parallel execution performance of the test combination (3.5) is better than the parallel execution performance of the best fork point candidate combination (3.2) (Step 111), the best fork point candidate combination becomes {f0, f1, f2} (Step 112). Since non-selected fork point candidates are remaining in the loop A (Step 113), a fourth execution of the loop A is started from Step 106.

Fourth Execution of Loop A, First Execution of Loop B (Iteration 1-4)

Similarly, in the execution of the loop A, the highest ranked fork point candidate is selected from the non-selected fork point candidates (Step 106). At this time, since the fork point candidates f0, f1 and f2 have already been selected, the fork point candidate f3 is selected. Since the fork point candidate f3 is not contained in the best fork point candidate combination {f0, f1, f2} (Step 107), the fork point candidate f3 is added to the best fork point candidate combination {f0, f1, f2}, so that the test combination becomes {f0, f1, f2, f3} (Step 108). Next, the parallel execution performance of the test combination is evaluated to yield 2.5 as the result thereof (Step 110). Since the parallel execution performance of the test combination (2.5) is worse than the parallel execution performance of the best fork point candidate combination (3.5) (Step 111), the best fork point candidate combination is still {f0, f1, f2}. Since all the fork point candidates have been selected in the loop A (Step 113), and a new best fork point candidate combination has been obtained in the third execution of the loop A (Step 114), all the fork point candidates are set to non-selected state (Step 115), then a second execution of the loop B is started from Step 106.

First Execution of Loop A, Second Execution of Loop B (Iteration 2-1)

First, in the execution of the loop A, the highest ranked fork point candidate is selected from the non-selected fork point candidates (Step 106). At this time, since all the fork point candidates are unselected, the fork point candidate f0 is selected. Since the fork point candidate f0 is contained in the best fork point candidate combination {f0, f1, f2} (Step 107), the fork point candidate f0 is removed from the best fork point candidate combination {f0, f1, f2}, so that the test combination becomes {f1, f2} (Step 109). Next, the parallel execution performance of the test combination is evaluated to yield 3.8 as the result thereof (Step 110). Since the parallel execution performance of the test combination (3.8) is better than the parallel execution performance of the best fork point candidate combination (3.5) (Step 111), the best fork point candidate combination becomes {f1, f2} (Step 112). Since non-selected fork point candidates are remaining in the loop A (Step 113), a second execution of the loop A is started from Step 106.

In the following, although detailed description will be omitted, a similar operation is performed as shown in FIG. 10.

Second Execution of Loop A, Second Execution of Loop B (Iteration 2-2)

The fork point candidate f2 is selected, so that the test combination becomes {f1}. The best fork point candidate combination is still {f1, f2}.

Third Execution of Loop A, Second Execution of Loop B (Iteration 2-3)

The fork point candidate f1 is selected, so that the test combination becomes {f2}. The best fork point candidate combination is still {f1, f2}.

Fourth Execution of Loop A, Second Execution of Loop B (Iteration 2-4)

The fork point candidate f3 is selected, so that the test combination becomes {f1, f2, f3}. The best fork point candidate combination is still {f1, f2}. Since all the fork point candidates have been selected in the loop A (Step 113), and a new best fork point candidate combination {f1, f2} has been obtained in the first execution of the loop A (Step 114), all the fork point candidates are set to non-selected state (Step 115), then a third execution of the loop B is started from Step 106.

First Execution of Loop A, Third Execution of Loop B (Iteration 3-1)

The fork point candidate f0 is selected, so that the test combination becomes {f0, f1, f2}. The best fork point candidate combination is still {f1, f2}.

Second Execution of Loop A, Third Execution of Loop B (Iteration 3-2)

The fork point candidate f2 is selected, so that the test combination becomes {f1}. The best fork point candidate combination is still {f1, f2}.

Third Execution of Loop A, Third Execution of Loop B (Iteration 3-3)

The fork point candidate f1 is selected, so that the test combination becomes {f2}. The best fork point candidate combination is still {f1, f2}.

Fourth Execution of Loop A, Third Execution of Loop B (Iteration 3-4)

The fork point candidate f3 is selected, so that the test combination becomes {f1, f2, f3}. The best fork point candidate combination is still {f1, f2}. Since all the fork point candidates are selected in the loop A (Step 113), and a new best fork point candidate combination has not been obtained in the iterative execution of the loop A (Step 114), the best fork point candidate combination {f1, f2} is outputted as the processing result of the best fork point candidate combination determination processing (Step 116), ending this process.

As described above, according to the instance of the first embodiment, the fork point candidates are ranked in the order in which they are predicted to have an effect on the parallel execution performance, and the parallel execution performance is evaluated in this order by taking as the reference the best fork point candidate combination at that time, to constitute the best combination. As it is apparent from the fact that, in contrast to 16 evaluations are required for the method in which the parallel execution performance is evaluated for all the fork point candidate combinations, the method in which the parallel execution performance is evaluated in accordance with the first embodiment requires only 12 evaluations, the effect is to allow the processing time of the best fork point candidate combination determination processing to be shortened.

In addition, in the first embodiment, although the parallel execution was simulated on a simulator of multiprocessor system for evaluation, parallel execution may be actually performed on a multiprocessor system for evaluation. Specifically, for the test fork point candidate combination whose parallel execution performance is to be evaluated, a parallelized program is generated by actually inserting a fork command, which is actually performed on the multiprocessor system to evaluate the parallel execution performance.

Second Embodiment

If a one-time fork model is adopted as the multithreading method, it is necessary to ensure that a thread generates a valid child thread at most once during its lifetime. To this end, there is a method in which limitation is statically imposed at the compilation stage to generate a parallelized program from a sequential processing program as disclosed in Reference 4 or the like, and a method that dynamically ensures this by a selection during the execution of the parent thread as disclosed in Reference 3; however in both methods, there are combinations in which the fork point candidates that cannot be executed simultaneously on the one-time fork model. That is, in case the one-time fork model is assumed, if the parallel execution performance is only evaluated for the test combinations in which the fork point candidates can be executed simultaneously, a shortening of the processing time for the best fork point candidate combination determination processing can be expected.

Figure 11:
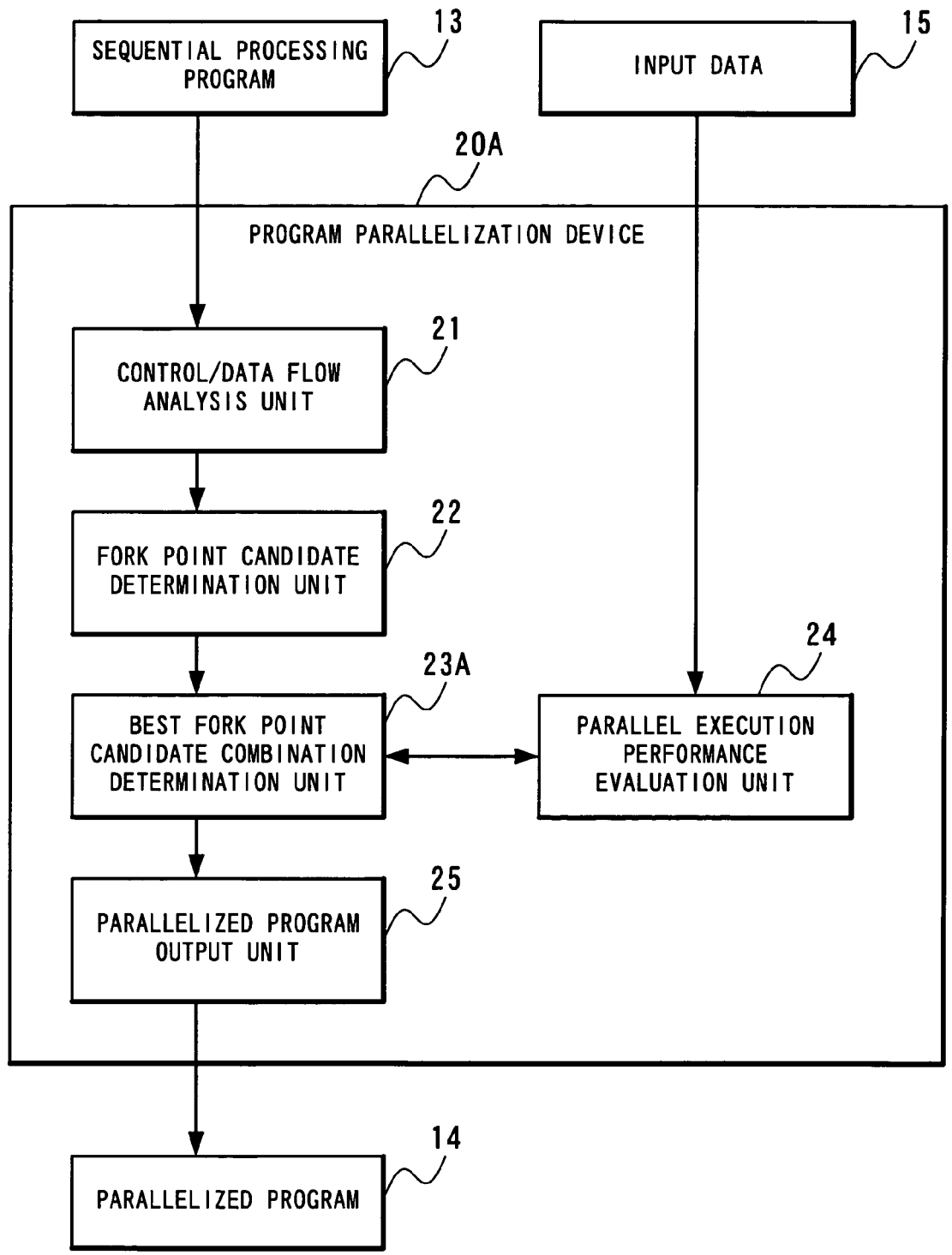
FIG. 11 is a block diagram illustrating the configuration of a program parallelization device in accordance with a second embodiment of the present invention.

Referring to FIG. 11, a program parallelization device 20A related to a second embodiment of the present invention comprises a control/data flow analysis unit 21 that analyzes the control flow and the data flow of a sequential processing program 13 that is entered, a fork point candidate determination unit 22 that determines the fork point candidates of the sequential processing program 13 by referring to the results of the analysis of the control flow and the data flow of the control/data flow analysis unit 21, a best fork point candidate combination determination unit 23A that generates a test combination only consisting of the combination of fork point candidates that can be simultaneously executed in the one-time fork model from the fork point candidates determined by the fork point candidate determination unit 22, provides it to a parallel execution performance evaluation unit 24, and by taking the parallel execution performance of the test fork point candidate combination evaluated thereby as the reference, determines the best fork point candidate combination, the parallel execution performance evaluation unit 24 that evaluates, with respect to an input data 15, the parallel execution performance when the sequential processing program 13 has been parallelized by the test fork point candidate combination obtained from the best fork point candidate combination determination unit 23A, and a parallelized program output unit 25 that generates and outputs a parallelized program 14 based on the best fork point candidate combination determined by the best fork point candidate combination determination unit 23A.

Figure 12:
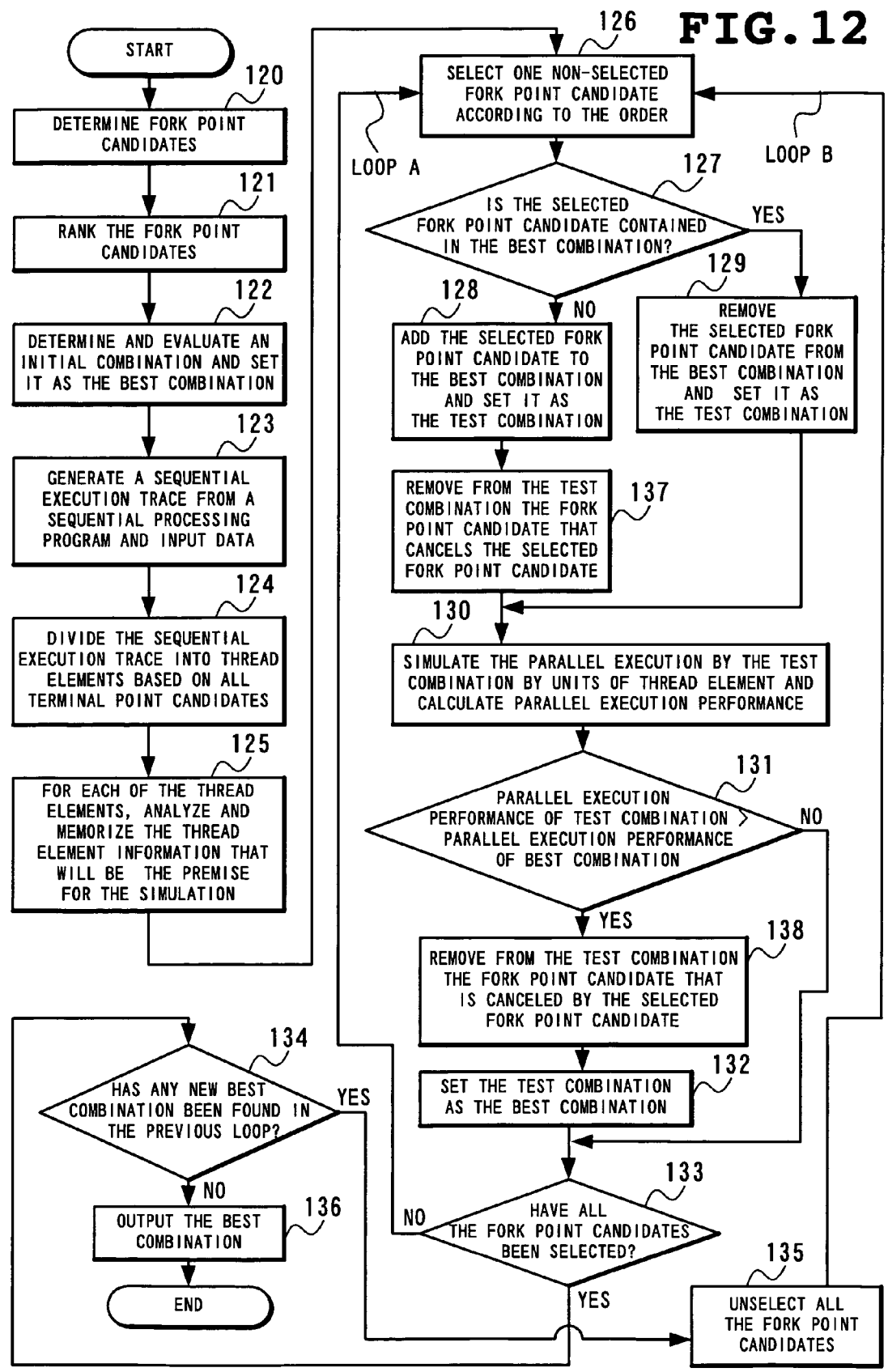
FIG. 12 is a flow chart illustrating the best fork point candidate combination determination processing in accordance with the second embodiment of the present invention.

Referring to FIG. 12, the best fork point candidate combination determination processing by the fork point candidate determination unit 22, the best fork point candidate combination determination unit 23A and the parallel execution performance evaluation unit 24 comprises a fork point candidate generation step 120, a fork point candidate ranking step 121, an initial fork point candidate combination generation step 122, a sequential execution trace generation step 123, a thread element division step 124, a thread element information analysis/memorization step 125, a fork point candidate selection step 126, a best fork point candidate combination assessment step 127, a fork point candidate insertion/test combination setting step 128, a cancelled fork point candidate deletion step 137, a fork point candidate removal/test combination setting step 129, a parallel execution performance calculation step 130, a parallel execution performance comparison step 131, a cancelled fork point candidate deletion step 138, a best combination setting step 132, an all fork point candidate selection assessment step 133, a new best combination discovery assessment step 134, an all fork point candidate non-selection setting step 135 and a best fork point candidate combination output step 136.

The best fork point candidate combination determination processing in FIG. 12 is an operation in a case that assumes a method as disclosed in Reference 3 is adopted as the method for ensuring the one-time fork limitation in which, if a child thread generated by a parent thread for each fork command of the parent thread already exists, the child thread is cancelled, thereby a fork command is selected to generate a valid child thread from a plurality of fork commands in the parent thread during the execution of the parent thread (see claim 2, Paragraph 0014 and the like in Reference 3).

As mentioned above, methods for achieving the one-time fork model mainly includes a method that imposes a static restriction at the compilation step that generates a parallelized program from a sequential processing program, and a method that dynamically ensures it by a selection during the execution of the parent thread. Concrete methods of the latter include a method in which, if the child thread generated by the parent thread for each fork command of the parent thread already exists, the child thread is cancelled, thereby one fork command is selected to generate the valid child thread from a plurality of fork commands in the parent thread during the execution of the parent thread, which is assumed in the second embodiment.

Assumed that, according to this method, when the fork point candidate f0 and the fork point candidate f1 are selected simultaneously, the fork point candidate. f1 is always cancelled by the fork point candidate f0, a case is considered, where the fork point candidate f1 is selected and added to a test combination including the fork point candidate f0 during an iteration of the loop A in the flow chart of the second embodiment. In this case, the fork point candidate f1 whose effect is to be evaluated is cancelled by the fork point candidate f0 at the time of parallel execution. Step 137 is equivalent to a process in which the fork point candidate f0 that is the cause of the cancellation is removed from the test combination beforehand so as to execute the fork point candidate f1.

Conversely, a case is considered, where the fork point candidate f0 is selected in an iteration of the loop A of the flow chart and added to the test combination including the fork point candidate f1. In this case, since the fork point candidate f0 whose effect is to be evaluated is not canceled, but the fork point candidate f1 is always cancelled, the presence of the fork point candidate f1 in the test combination is meaningless. Step 138 is equivalent to a process in which a fork point candidate that is always cancelled and is meaningless is removed beforehand.

Next, the operation of the program parallelization device 20 related to the second embodiment constituted in such a manner will be described.

First, the control/data flow analysis unit 21 analyzes the control flow and the data flow of the sequential processing program 13.

Next, the fork point candidate determination unit 22 generates the fork point candidates by referring to the results of the analysis of the control flow and the data flow by the control/data flow analysis unit 21 (Step 120).

Next, the best fork point candidate combination determination unit 23A predicts the effect of each of all the fork point candidates on the parallel execution performance and ranks the fork point candidates in the order of the effects (Step 121). For the prediction of the effect, for example, by referring to the result of a sequential execution trace at the time of sequential execution, the effect may be predicted by referring to the number of execution cycles from a fork point to a fork destination of the fork point candidate subjected to the prediction or the number of occurrences of the fork point candidate, or the effect may be determined by evaluating the parallel execution performance when each fork point candidate is individually executed in parallel, with the parallel execution performance evaluation unit 24. Moreover, the relationship is determined between the fork point candidates that trigger the cancellation of the fork that ensures the one-time fork limitation. This can be obtained by referring to the result of the sequential execution trace and the control flow graph. For example, if, in the execution flow of the sequential processing program 13, the fork point of a fork point candidate fb exists between the fork point and the fork destination of a fork point candidate fa, the fork point candidate fa is cancelled by the fork point candidate fb during execution.

Then, the best fork point candidate combination determination unit 23A generates an initial fork point candidate combination whose parallel execution performance is evaluated first, and which is assumed to be the best fork point candidate combination (Step 122). This can be achieved for instance by assuming that the initial combination is the fork point candidate combination that includes a prescribed number of fork point candidates from the top of the fork point candidate order that was determined at Step 121, evaluating the parallel execution performance of the initial combination with the parallel execution performance evaluation unit 24, and assuming the initial combination to be the best fork point candidate combination at this time.

The parallel execution performance evaluation unit 24 first generates the sequential execution trace when the sequential processing program 13 was sequentially executed with the input data 15 (Step 123).

Next, the parallel execution performance evaluation unit 24 divides the sequential execution trace by taking all the terminal point candidates as division points (Step 124).

The parallel execution performance evaluation unit 24 then analyzes thread element information such as the number of execution cycles for each thread element, the fork point candidate that occurs within the thread element and the occurrence location thereof, the thread element of the fork destination and memory dependency between the thread elements, which are memorized for each thread element (Step 125).

Next, the best fork point candidate combination determination unit 23A selects one fork point candidate that is ranked highest among the non-selected fork point candidates, while a loop A comprised of Steps 126-133 is iteratively executed (Step 126).

The best fork point candidate combination determination unit 23A assesses whether the fork point candidate selected at Step 126 is contained in the best fork point candidate combination (Step 127).

If the selected fork point candidate is not contained in the best fork point candidate combination, the best fork point candidate combination determination unit 23A adds the fork point candidate selected at Step 126 to the best fork point candidate combination, and the fork point candidate combination is assumed to be a test combination (Step 128).

Next, the best fork point candidate combination determination unit 23A removes the fork point candidate that cancels the fork point candidate selected at Step 126 from the test combination (Step 137).

On the other hand, if the selected fork point candidate is contained in the best fork point candidate combination, the best fork point candidate combination determination unit 23A removes the fork point candidate selected at Step 126 from the best fork point candidate combination, and the fork point candidate combination is assumed to be a test combination (Step 129).

Next, the best fork point candidate combination determination unit 23A evaluates the parallel execution performance of parallelization by the test combination through the parallel execution performance evaluation unit 24 (Step 130).

The best fork point candidate combination determination unit 23A then compares the parallel execution performance of the test combination with the parallel execution performance of the best combination (Step 131). If the parallel execution performance of the test combination is worse, the best fork point candidate combination determination unit skips Step 138 and Step 132.

If the parallel execution performance of the test combination is better, the best fork point candidate combination determination unit 23A removes the fork point candidate, which is cancelled by the fork point candidate selected at Step 126, from the test combination (Step 138).

Next, the best fork point candidate combination determination unit 23A sets the test combination as the best fork point candidate combination at the current time (Step 132).

Next, the best fork point candidate combination determination unit 23A assesses whether a fork point candidate that has not been selected in the iterative execution of the loop A exists (Step 133). If a non-selected fork point candidate exists, the control is returned to Step 126 and iteratively executed as the loop A.

If a non-selected fork point candidate does not exist, that is, if all the fork point candidates have been selected, the best fork point candidate combination determination unit 23A assesses whether a new best fork point candidate combination is found in the previous iterative execution of the loop A (Step 134).

If a new fork point candidate combination is found, the best fork point candidate combination determination unit 23A sets all the fork point candidates to the non-selected state for the iterative execution of the loop A (Step 135), the control is returned to Step 126 and iteratively executed as loop B.

If a new best fork point candidate combination is not found, the best fork point candidate combination determination unit 23A outputs the determined best fork point candidate combination to the parallelized program output unit 25 as the result of the best fork point candidate combination determination processing (Step 136).

Finally, the parallelized program output unit 25 generates and outputs the parallelized program 14 by inserting a fork command at each fork point candidate of the best combination determined by the best fork point candidate combination determination unit 23A.

As described above, according to the second embodiment, if a one-time fork model is adopted as a multithreading method, since the parallel execution performance is evaluated only with respect to the test combinations in which the fork point candidates can be executed simultaneously, the second embodiment has the effect of allowing the processing time for the best fork point candidate combination determination processing to be further shortened compared to the first embodiment.

Instance of Second Embodiment

Referring to FIGS. 9 and 13, an instance of the best fork point candidate combination determination processing in accordance with the second embodiment will be described.

Assumed here are f0, f1, f2 and f3 as fork point candidates. The total number of the fork point candidate combinations at this time is 16, including the case of a sequential execution with no forking at all ($\phi$).

How many times the performance of the sequential execution performance (in the $\phi$ case) is achieved by parallel execution is used as an indicator of the parallel exaction performance. Each parallel execution performance of the 16 fork point candidate combinations is assumed as shown in FIG. 9. In this case, the parallel execution performance when f1 and f2 are selected as the fork point candidates is the highest, which is a performance of 3.8 times the sequential execution.

Next, the details of the operation of the best fork point candidate combination determination processing in accordance with the second embodiment with respect to the instance shown in FIG. 9 will be described also referring to the flow chart in FIG. 2.

First, in Step 120, it is assumed that f0, f1, f2 and f3 have been obtained as fork point candidates.

Next, the fork point candidates are ranked in Step 121. At this time, the ranking is performed in the order in which the parallel execution performance is highest taking as the indicator the parallel execution performance when each fork point candidate is individually parallelly executed. Referring to each parallel execution performance shown in FIG. 9, the order is f0, f2, f1 and f3. Next, the cancellation relationships between the fork point candidates are determined. Here, the relationships that are assumed are that the fork point candidate f0 cancels the fork point candidate f1, and the fork point candidate f2 cancels the fork point candidate f3.

Then, an initial combination is generated in Step 122. Two from the top of the fork point candidate order determined in Step 121 are used in the initial combination to give the initial combination {f0, f2}. The parallel execution performance of {f0, f2} is evaluated to yield 3.2 as the result thereof. {f0, f2} becomes the best fork point candidate combination at this time.

Next, the loops A and B are iteratively executed from Step 126. The state of the operation for each iteration is shown in FIG. 13.

First Execution of Loop A, First Execution of Loop B (Iteration 1-1)

First, in the execution of the loop A, the highest ranked fork point candidate is selected from the non-selected fork point candidates (Step 126). At this time, since all the fork point candidates are unselected, the fork point candidate f0 is selected. Since the fork point candidate f0 is contained in the best fork point candidate combination {f0, f2} (Step 127), the fork point candidate f0 is removed from the best fork point candidate combination {f0, f2}, so that the test combination becomes {f2} (Step 129). Next, the parallel execution performance of the test combination is evaluated to yield 2.4 as the result thereof (Step 130). Since the parallel execution performance of the test combination (2.4) is worse than the parallel execution performance of the best fork point candidate combination (3.2) (Step 131), the best fork point candidate combination is still {f0, f2}. Since non-selected fork point candidates are remaining in the loop A (Step 133), a second execution of the loop A is started from Step 126.

Second Execution of Loop A, First Execution of Loop B (Iteration 1-2)

Similarly, in the execution of the loop A, the highest ranked fork point candidate is selected from the non-selected fork point candidates (Step 126). At this time, since the fork point candidate f0 has already been selected, the fork point candidate f2 is selected. Since the fork point candidate f2 is contained in the best fork point candidate combination {f0, f2} (Step 127), the fork point candidate f2 is removed from the best fork point candidate combination {f0, f2}, so that the test combination becomes {f0} (Step 129). Next, the parallel execution performance of the test combination is evaluated to yield 2.5 as the result thereof (Step 130). Since the parallel execution performance of the test combination (2.5) is worse than the parallel execution performance of the best fork point candidate combination (3.2) (Step 131), the best fork point candidate combination is still {f0, f2}. Since non-selected fork point candidates are remaining in the loop A (Step 133), a third execution of the loop A is started from Step 126.

Third Execution of Loop A, First Execution of Loop B (Iteration 1-3)

Similarly, in the execution of the loop A, the highest ranked fork point candidate is selected from the non-selected fork point candidates (Step 126). At this time, since the fork point candidates f0 and f2 have already been. selected, the fork point candidate f1 is selected. Since the fork point candidate f1 is not contained in the best fork point candidate combination {f0, f2} (Step 127), the fork point candidate f1 is added to the best fork point candidate combination {f0, f2}, so that the test combination becomes {f0, f1, f2} (Step 128). Next, since the selected fork point candidate f1 is cancelled by the fork point candidate f0, the fork point candidate f0 is removed from the test combination {f0, f1, f2}, so that the test combination becomes {f1, f2} (Step 137). Next, the parallel execution performance of the test combination is evaluated to yield 3.8 as the result thereof (Step 130). Since the parallel execution performance of the test combination (3.8) is better than the parallel execution performance of the best fork point candidate combination (3.2) (Step 131), the best fork point candidate combination becomes {f1, f2} (Step 132). Since non-selected fork point candidates are remaining in the loop A (Step 133), a fourth execution of the loop A is started from Step 126.

Fourth Execution of Loop A, First Execution of Loop B (Iteration 1-4)

Similarly, in the execution of the loop A, the highest ranked fork point candidate is selected from the non-selected fork point candidates (Step 126). At this time, since the fork point candidates f0, f1 and f2 have already been selected, the fork point candidate f3 is selected. Since the fork point candidate f3 is not contained in the best fork point candidate combination {f1, f2} (Step 127), the fork point candidate f3 is added to the best fork point candidate combination {f1, f2}, so that the test combination becomes {f1, f2, f3} (Step 128). Next, since the selected fork point candidate f3 is cancelled by the fork point candidate f2, the fork point candidate f2 is removed from the test combination {f1, f2, f3}, so that the test combination becomes {f1, f3} (Step 137). Next, the parallel execution performance of the test combination is evaluated to yield 2.8 as the result thereof (Step 130). Since the parallel execution performance of the test combination (2.8) is worse than the parallel execution performance (3.8) of the best fork point candidate combination {f1, f2} (Step 131), the best fork point candidate combination is still {f1, f2}. Since all the fork point candidates have been selected in the loop A (Step 133), and a new best fork point candidate combination has been obtained in the third execution of the loop A (Step 134), all the fork point candidates are set to non-selected state (Step 135), then a second execution of the loop B is started from Step 126.

First Execution of Loop A, Second Execution of Loop B (Iteration 2-1)

First, in the execution of the loop A, the highest ranked fork point candidate is selected from the non-selected fork point candidates (Step 126). At this time, since all the fork point candidates are unselected, the fork point candidate f0 is selected. Since the fork point candidate f0 is not contained in the best fork point candidate combination {f1, f2} (Step 127), the fork point candidate f0 is added to the best fork point candidate combination {f1, f2}, so that the test combination becomes {f0, f1, f2} (Step 128). Next, the parallel execution performance of the test combination is evaluated to yield 3.5 as the result thereof (Step 130). Since the parallel execution performance of the test combination (3.5) is worse than the parallel execution performance (3.8) of the best fork point candidate combination {f1, f2} (Step 131), the best fork point candidate combination is still {f1, f2}. Since non-selected fork point candidates are remaining in the loop A (Step 133), a second execution of the loop A is started from Step 126.

In the following, although detailed description will be omitted, a similar operation is performed as shown in FIG. 13.

Second Execution of Loop A, Second Execution of Loop B (Iteration 2-2)

The fork point candidate f2 is selected, so that the test combination becomes {f1}. The best fork point candidate combination is still {f1, f2}.

Third Execution of Loop A, Second Execution of Loop B (Iteration 2-3)

The fork point candidate f1 is selected, so that the test combination becomes {f2}. The best fork point candidate combination is still {f1, f2}.

Fourth Execution of Loop A, Second Execution of Loop B (Iteration 2-4)

The fork point candidate f3 is selected, so that the test combination becomes {f1, f3}. The best fork point candidate combination is still {f1, f2}. Since all the fork point candidates are selected in the loop A (Step 133), and a new best fork point candidate combination has not been obtained in the iterative execution of the loop A (Step 134), the best fork point candidate combination {f1, f2} is outputted as the processing result of the best fork point candidate combination determination processing (Step 136), ending this process.

As described above, according to the instance of the second embodiment, if a one-time fork model is adopted as a multi-threading method, since the parallel execution performance is evaluated only with respect to the test combinations in which the fork point candidates can be executed simultaneously, as is evident from the best fork point candidate combination determination processing being completed with eight evaluations, the instance of the second embodiment has the effect of allowing the processing time for the best fork point candidate combination determination processing to be further shortened compared to the instance of the first embodiment.

Third Embodiment

Since the total number of fork point candidate combinations increases exponentially with respect to the number of the fork point candidates, as the number of fork point candidates increases, the processing time for the best fork point candidate combination determination processing also increases rapidly. In contrast, if the fork point candidates are divided into the appropriate number of groups, and the determination of the best fork point candidate combination is independently processed for each group, the total number of fork point candidate combination can be reduced, thereby allowing the best fork point candidate combination to be determined rapidly even if the number of fork point candidates is large. In order to obtain the fork point candidate having a higher parallel execution performance, group partition of the fork point candidates is especially important, and in order to allow for an independent best fork point candidate combination determination processing, group partition in a way so that the groups have minimal effect on each other is necessary. In the third embodiment, this is achieved by referring to the cancellation relationship between the fork point candidates and performing group partition with a strong relationship if there is a cancellation relationship, and with a weak relationship if there is no cancellation relationship.

Figure 14:
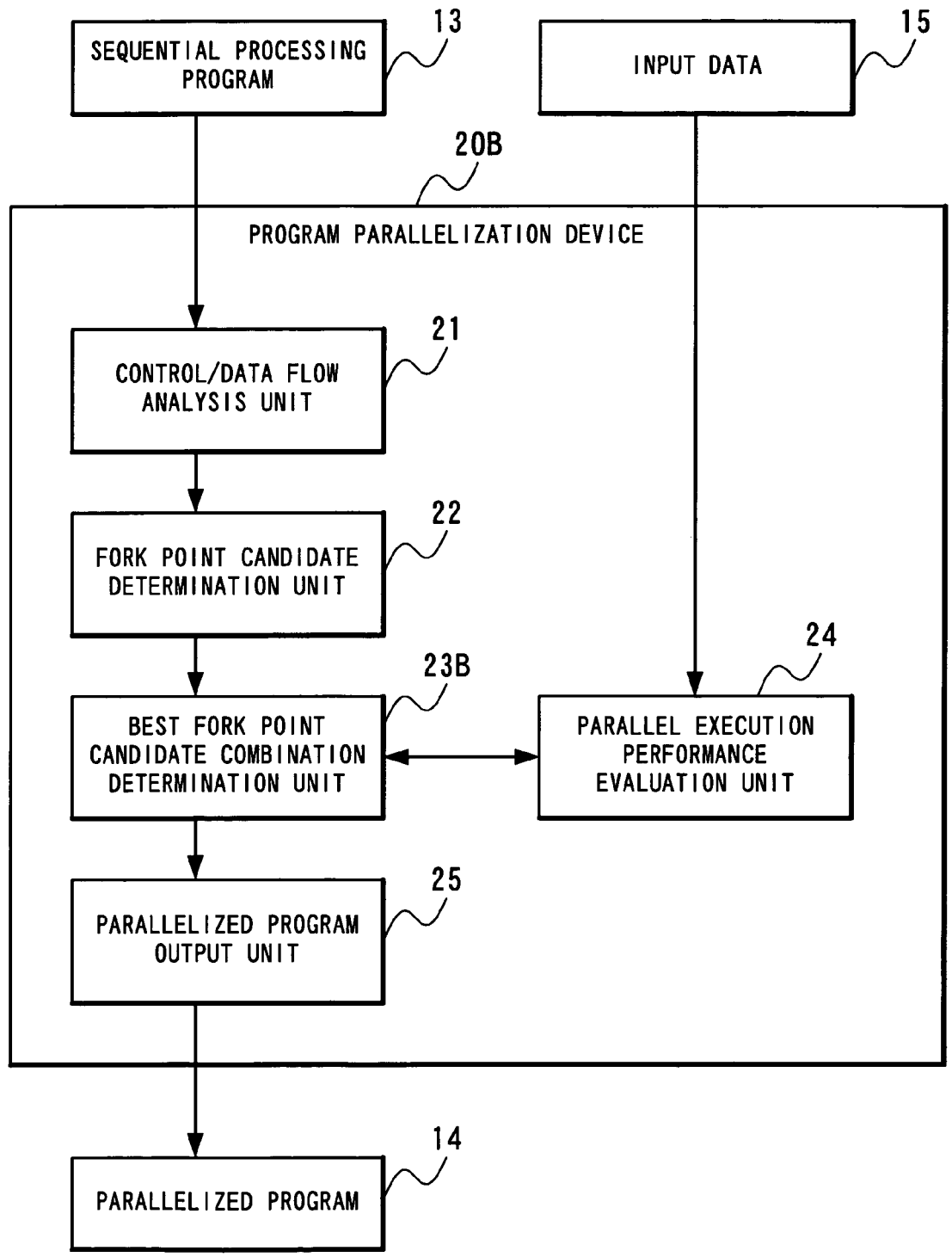
FIG. 14 is a block diagram illustrating the configuration of a program parallelization device in accordance with a third embodiment of the present invention.

Referring to FIG. 14, a program parallelization device 20B related to a third embodiment of the present invention comprises a control/data flow analysis unit 21 that analyzes the control flow and the data flow of a sequential processing program 13 that is entered, a fork point candidate determination unit 22 that determines the fork point candidates of the sequential processing program 13 by referring to the results of the analysis of the control flow and the data flow of the control/data flow analysis unit 21, a best fork point candidate combination determination unit 23B that divides the collection of all the fork point candidates that have been determined by the fork point candidate determination unit 22 into fork point candidate groups in such a way that they have as little effects as possible on each other, generates a test fork point candidate combination for a group in the divided fork point candidate groups in which the best fork point candidate combination determination processing has not been performed, performs the best fork point candidate combination determination processing that determines the best fork point candidate combination by referring to the result of parallel execution performance of the test fork point candidate combination evaluated by a parallel execution performance evaluation unit 24, and determines the sum of the best fork point candidate combinations, which are the processing results for each group, as the overall processing result, the parallel execution performance evaluation unit 24 that evaluates, with respect to an input data 15, the parallel execution performance when the sequential processing program 13 is parallelized by the test fork point candidate combination obtained from the best fork point candidate combination determination unit 23B, and a parallelized program output unit 25 that generates and outputs a parallelized program 14 based on the best fork point candidate combination determined by the best fork point candidate combination determination unit 23B.

Figure 15:
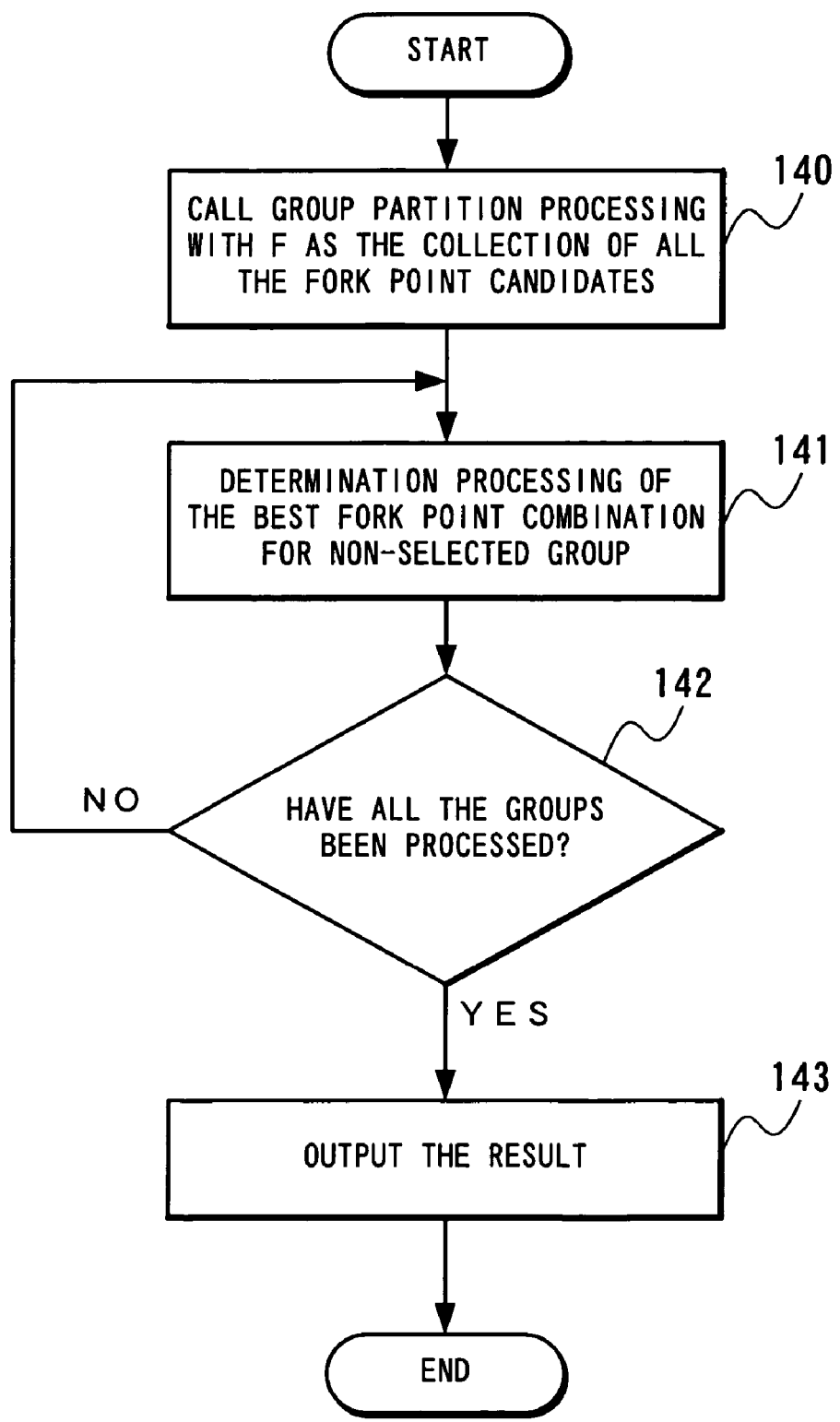
FIG. 15 is a flow chart illustrating the best fork point candidate combination determination processing in accordance with the third embodiment of the present invention.

Referring to FIG. 15, the best fork point candidate combination determination processing by the best fork point candidate combination determination unit 23B comprises a group partition processing calling step 140, a best fork point candidate combination for group determination processing step 141 applied to a group, an overall group processing assessment step 142, and a result output step 143.

Figure 16:
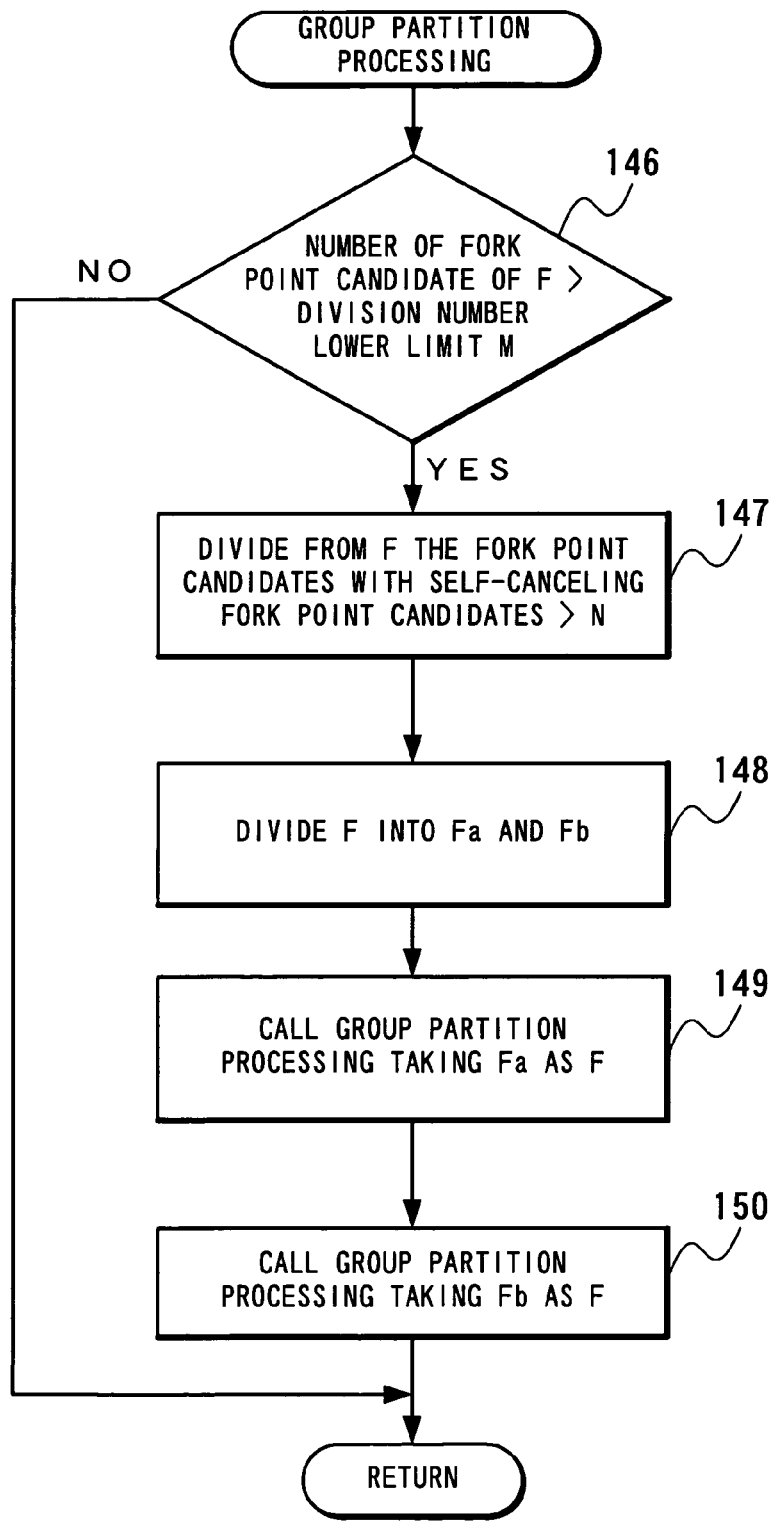
FIG. 16 is a flow chart illustrating the best fork point candidate combination determination processing in accordance with the third embodiment of the present invention.

Referring to FIG. 16, the group partition processing of the fork point candidates by the best fork point candidate determination unit 23B comprises a fork point candidate number/division number lower limit comparison step 146, a fork point candidate division step 147, a group partition of collection step 148, a group partition processing calling step 149, and a group partition processing calling step 150.

Next, the operation of the program parallelization device 20B related to the third embodiment constituted in such a manner will be described.

The processing of the control/data flow analysis unit 21 and the fork point candidate determination unit 22 being absolutely identical to the operations in the first and second embodiments, the description will be omitted.

After the processing of the fork point candidate determination unit 22 has been completed, the best fork point candidate combination determination unit 23B calls the fork point candidate group partition processing, shown in the flow chart of FIG. 16, taking the collection of all the fork point candidates determined by the fork point candidate determination unit 22 as F (Step 140).

In the fork point candidate group partition processing, the best fork point candidate combination determination unit 23B divides the fork point candidates into a binary tree by referring to the cancellation relationship between the fork point candidates. In addition, the division number lower limit M and the designated number N are appropriately given, for example, M=300, N=M/2.

When the fork point candidate group partition processing shown in FIG. 16 is called from Step 140, the best fork point candidate combination determination unit 23B first starts the group partition processing of the collection F from Step 147 if the number of fork point candidates belonging to the given fork point candidate collection F is higher than the designated division number lower limit M (Step 146). If the number of fork point candidates is lower than M, the best fork point candidate combination determination unit 23B returns to the origin from where the fork point candidate group partition processing was called (Step 140, Step 149 or Step 150) without performing the group partition processing.

Next, the fork point candidate collections in which the number of fork point candidates that cancel themselves is higher than the designated number N are divided from the collection F by the best fork point candidate combination determination unit 23B to generate a new group (Step 147).

The best fork point candidate combination determination unit 23B then further divides the collection F into two groups Fa and Fb (Step 148). At this time, group partition is performed so that the sum between the number of fork point candidates belonging to the group Fb among the fork point candidates that cancel fork point candidates belonging to the group Fa, and the number of fork point candidates belonging to the group Fa among the fork point candidates that cancel fork point candidates belonging to the group Fb is minimized. The reason is to perform group partition so that correlation between the fork point candidates is minimized. At this time, it is not necessary that the number of fork point candidates belonging respectively to the two groups Fa and Fb be equal, any difference is allowed as long as the sum is reduced.

Next, the best fork point candidate combination determination unit 23B recursively calls the fork point candidate group partition processing taking the group Fa as the collection F and performs group partition of the group Fa (Step 149).

Similarly, the best fork point candidate combination determination unit 23B recursively calls the fork point candidate group partition processing taking the group Fb as the collection F and performs group partition of the group Fb (Step 150).

Thereafter, the best fork point candidate combination determination unit 23B returns to the origin from where the fork point candidate group partition processing was called (Step 140, Step 149 or Step 150).

Next, the best fork point candidate combination determination unit 23B performs the best fork point candidate combination determination processing for the groups in which the best fork point candidate combination determination processing has not been performed among the groups of fork point candidates that were divided at Step 140. The best fork point candidate combination determination processing of the first or second embodiments may be applied to this best fork point candidate combination determination processing, and in case the number of fork point candidates for each group is low enough, the parallel execution performance may be evaluated with respect to all the fork point candidate combinations within the group to determine the best fork point candidate combination. If the fork point candidate best combination determination processing of the first or second embodiments is applied, the initial fork point candidate combination may be comprised of the fork point candidates within the group only.

Next, the best fork point candidate combination determination unit 23B determines whether the processing of all the groups has been completed (Step 142), if there is a group that has not been processed, the control is returned to Step 141, and the best fork point candidate combination determination processing is reiterated for the groups that have not been processed.

When processing of all the groups has been completed, the best fork point candidate combination determination unit 23B outputs the sum of the fork point candidate combination, which is the result of the processing for each group, as the overall result (Step 143).

Instance of Third Embodiment

Figure 17:
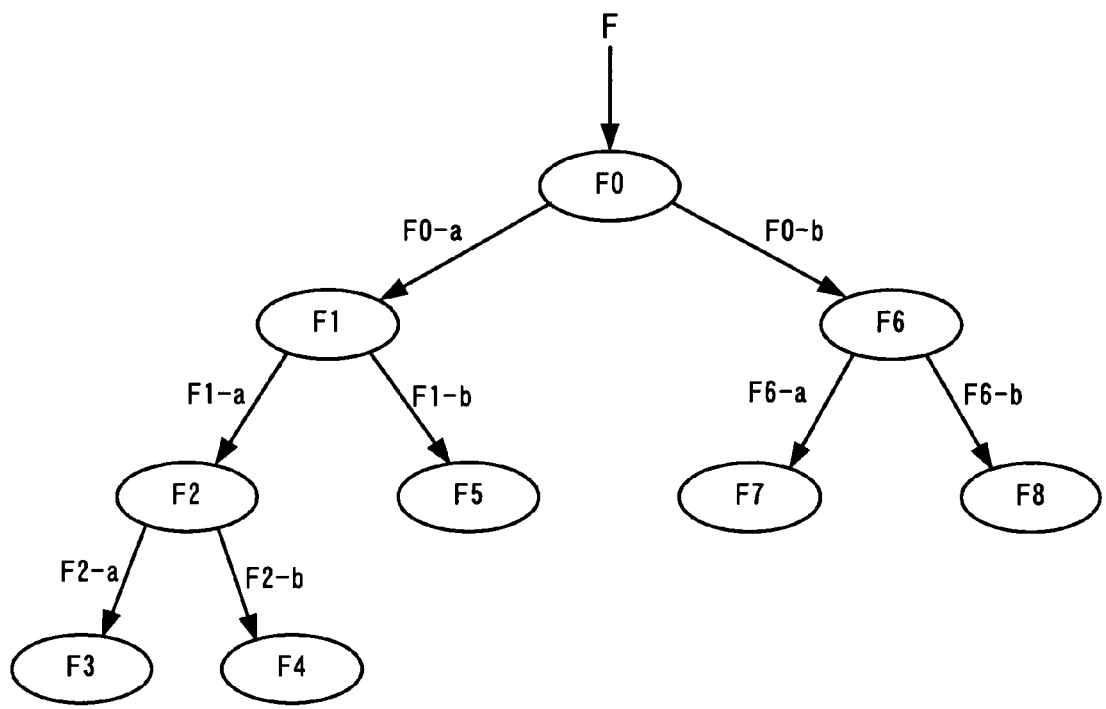
FIG. 17 is a diagram illustrating an example of group partition of the fork point candidates in accordance with the third embodiment of the present invention.

Referring to FIG. 17, an instance of the fork point candidate group partition processing in the program parallelization device 20B according to the third embodiment will be described.

Taking the collection of all the fork point candidates as a collection F, the program parallelization device 20B performs group partition of the collection F. If the number of the fork point candidates in the collection F is assumed to be equal to or greater than the division number lower limit M (Step 146), the fork point candidates in which the number of fork point candidates that cancel themselves is greater than the designated number N are divided from the collection F to form a new group F0 (Step 147). Next, the collection F is divided into two groups F0-a and F0-b (Step 148). Namely, the collection F is divided into three groups of fork point candidates F0, F0-a and F0-b. Next, the fork point candidate group partition processing is performed again for the groups F0-a and F0-b (Steps 149 and 150).

Similarly, if the number of fork point candidates in the group F0-a is assumed to be equal to or greater than the division number lower limit M, the group F0-a is divided into groups F1, F1-a and F1-b. The group partition processing is performed again for the groups F1-a and F1-b.

Similarly, if the number of fork point candidates in the group F1-a is assumed to be equal to or greater than the division number lower limit M, the group F1-a is divided into groups F2, F2-a and F2-b. The group partition processing is performed again for the groups F2-a and F2-b.

Next, if the number of fork point candidates in the group F2-a is assumed to be equal to or less than the division number lower limit M, the group F2-a is not further divided, and is set as a group F3.

Next, if the number of fork point candidates in the group F2-b is assumed to be equal to or less than the division number lower limit M, the group F2-b is not further divided, and is set as a group F4.

Similarly, if the number of fork point candidates in the group F1-b is assumed to be equal to or less than the division number lower limit M, the group F1-b is not further divided, and is set as a group F5.

Next, if the number of fork point candidates in the group F0-b is assumed to be equal to or greater than the division number lower limit M, the group F0-b is divided into groups F6, F6-a and F6-b. The group partition processing is performed again for the groups F6-a and F6-b.

Next, if the number of fork point candidates in the group F6-a is assumed to be equal to or less than the division number lower limit M, the group F6-a is not further divided, and is set as a group F7.

Next, if the number of fork point candidates in the group F6-b is assumed to be equal to or less than the division number lower limit M, the group F6-b is not further divided, and is set as a group F8.

In this way, the collection Fa of all the fork point candidates has been divided into groups F0-F8 of fork point candidates that have little effect on each other.

As descried above, according to the third embodiment, since the fork point candidates are divided into the appropriate number of groups so as to minimize the mutual influence between the groups to perform the best fork point candidate combination determination processing independently for each group, the total number of fork point candidate combinations can be reduced, and the best fork point candidate combination can be determined rapidly even if the number of fork point candidates is large.

Fourth Embodiment

Figure 18:
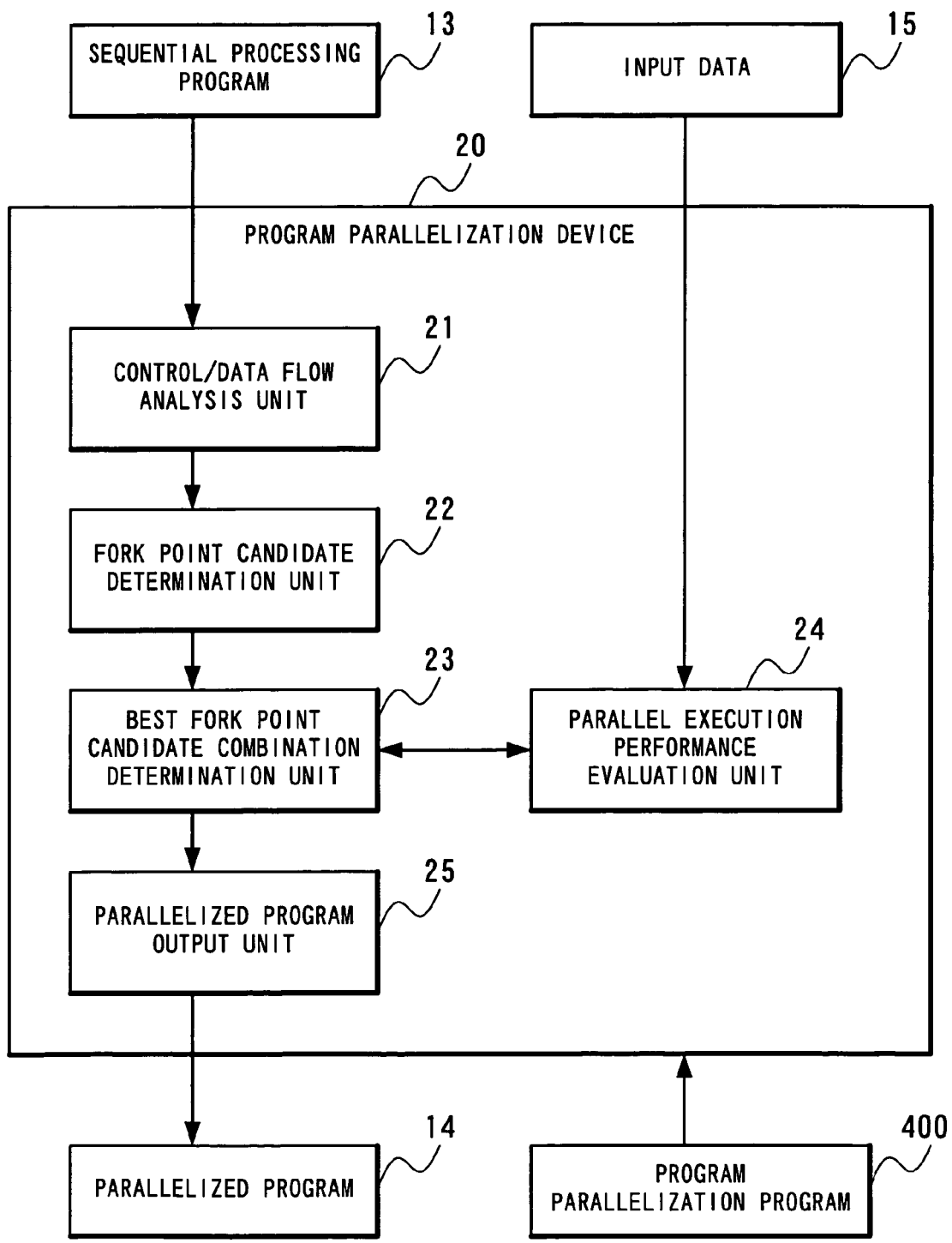
FIG. 18 is a block diagram illustrating the configuration of a program parallelization device in accordance with a fourth embodiment of the present invention.

FIG. 18 is a block diagram illustrating the configuration of a program parallelization device 20 in accordance with a fourth embodiment of the present invention. The program parallelization device 20 in accordance with the present embodiment differs from the program parallelization device 20 in accordance with the first embodiment shown in FIG. 1 on the point that it additionally has a program parallelization program 400. Therefore, unless otherwise noted, the same keys will be used, the detailed explanation thereof being omitted.

The program parallelization program 400 is read into the program parallelization device 20 comprised of a computer, and controls the operation of the program parallelization device 20 as a control/data flow analysis unit 21, a fork point candidate determination unit 22, a best fork point candidate combination determination unit 23, a parallel execution performance evaluation unit 24 and a parallelized program output unit 25. Since the operation of the program parallelization device 20, which is controlled by the program parallelization program 400 is absolutely identical to the operation of the program parallelization device 20 in the first embodiment, the detailed description will be omitted.

Fifth Embodiment

Figure 19:
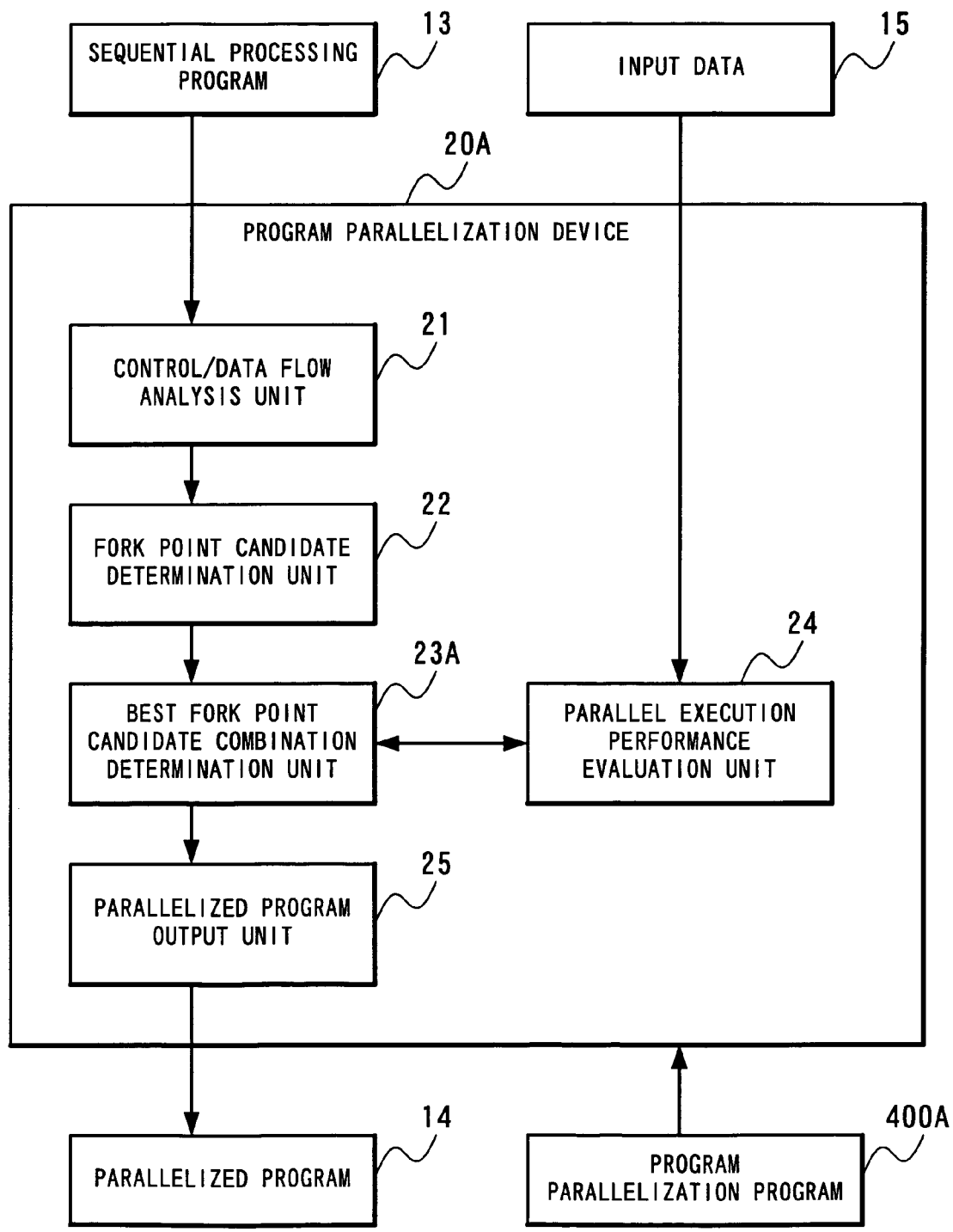
FIG. 19 is a block diagram illustrating the configuration of a program parallelization device in accordance with a fifth embodiment of the present invention.

FIG. 19 is a block diagram illustrating the configuration of a program parallelization device 20A in accordance with a fifth embodiment of the present invention. The program parallelization device 20A in accordance with the present embodiment differs from the program parallelization device 20A in accordance with the second embodiment shown in FIG. 11 on the point that it additionally has a program parallelization program 400A. Therefore, unless otherwise noted, the same keys will be used, the detailed explanation thereof being omitted.

The program parallelization program 400A is read into the program parallelization device 20A comprised of a computer, and controls the operation of the program parallelization device 20A as a control/data flow analysis unit 21, a fork point candidate determination unit 22, a best fork point candidate combination determination unit 23A, a parallel execution performance evaluation unit 24 and a parallelized program output unit 25. Since the operation of the program parallelization device 20A, which is controlled by the program parallelization program 400A is absolutely identical to the operation of the program parallelization device 20A in the second embodiment, the detailed description will be omitted.

Sixth Embodiment

Figure 20:
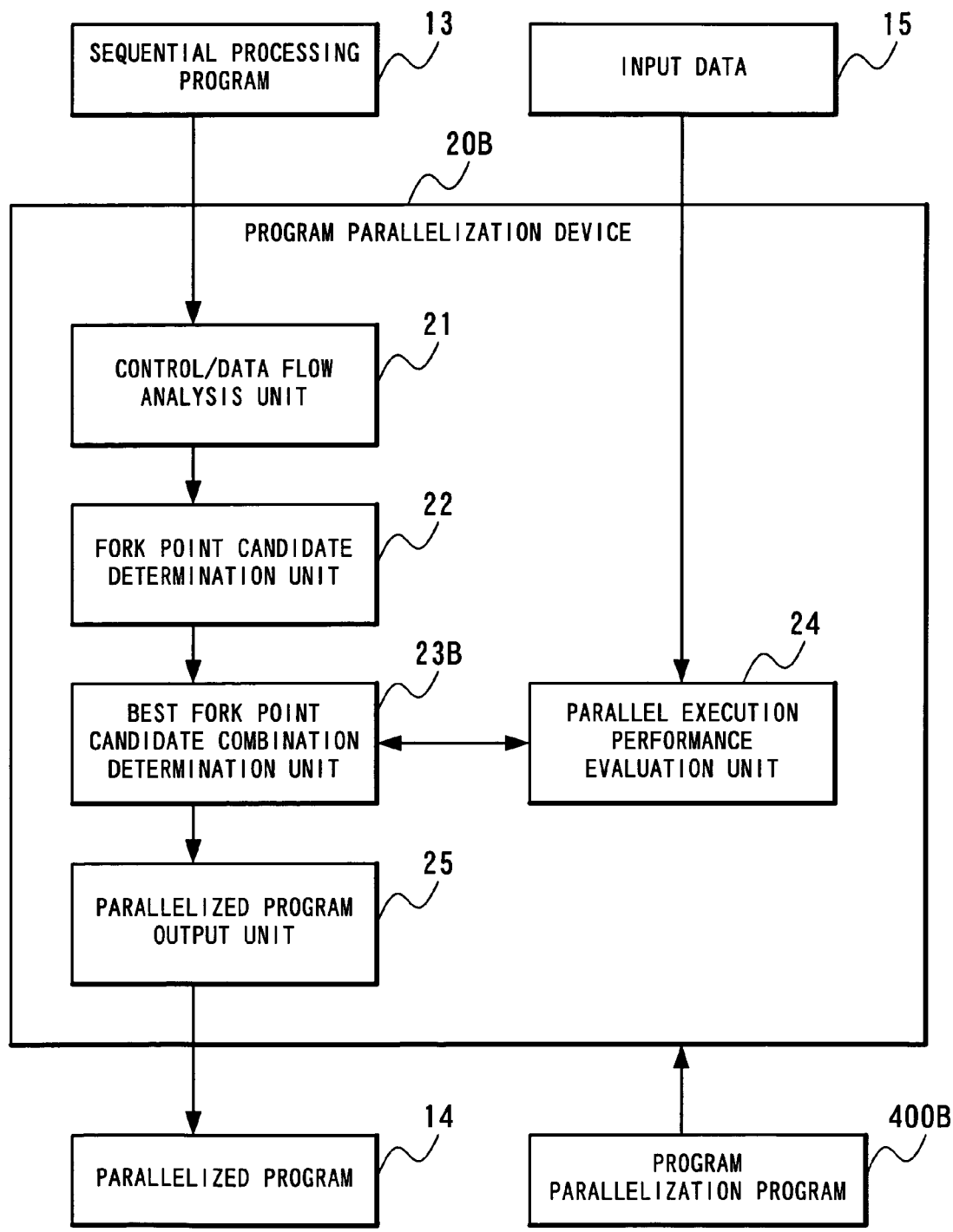
FIG. 20 is a block diagram illustrating the configuration of a program parallelization device in accordance with a sixth embodiment of the present invention.
Figure 21:
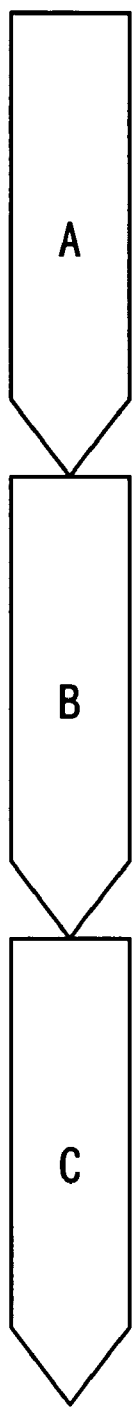
FIG. 21 is a diagram illustrating the overview of a multithreading method.
Figure 22:
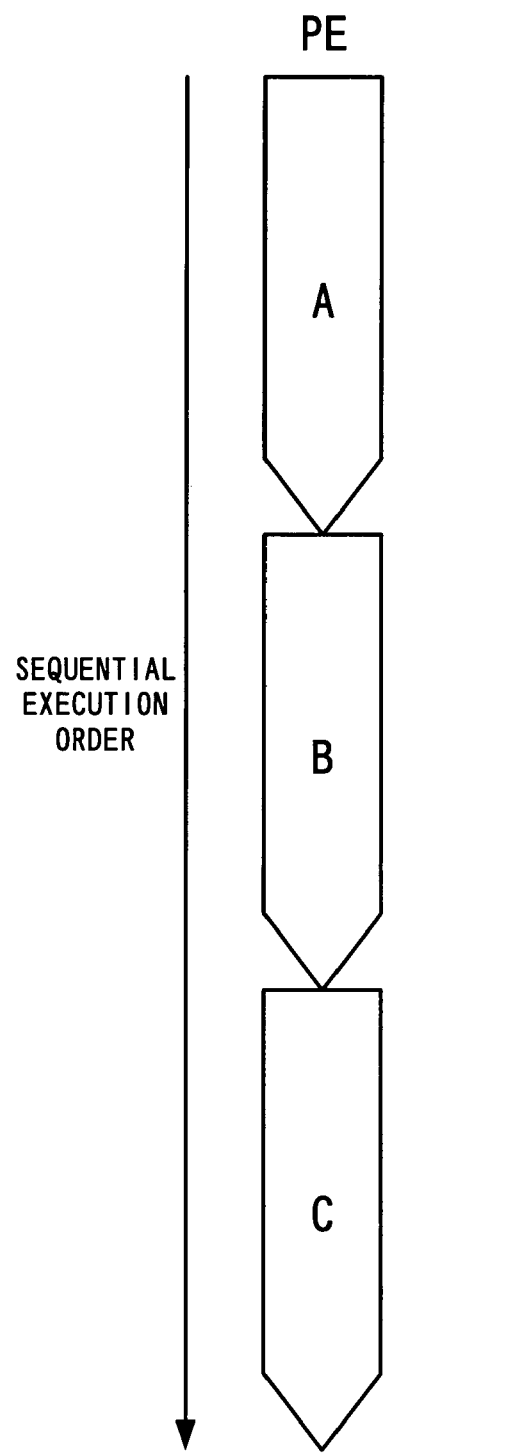
FIG. 22 is a diagram illustrating the overview of the multithreading method.
Figure 23:
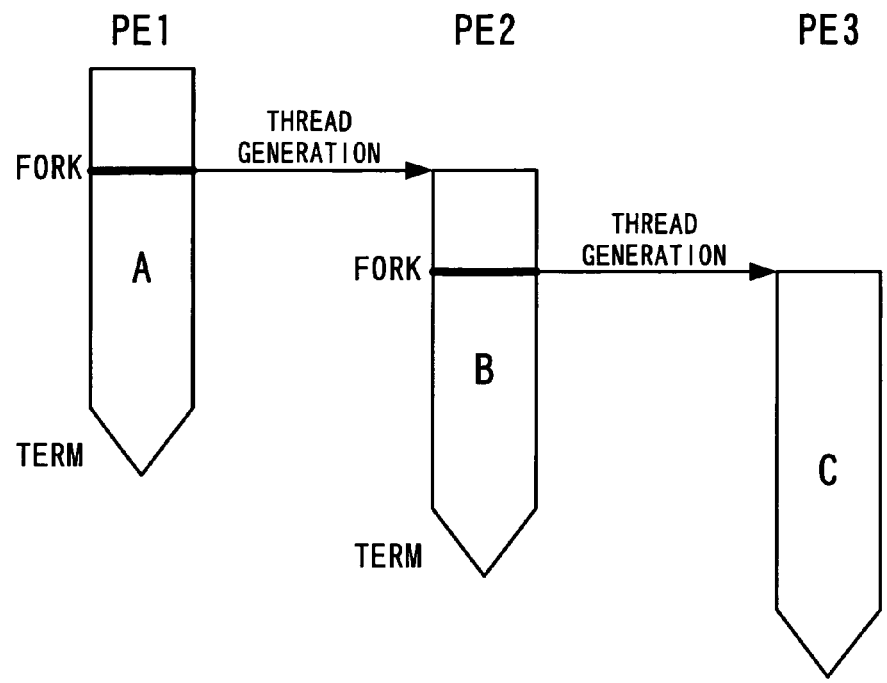
FIG. 23 is a diagram illustrating the overview of the multithreading method.
Figure 24:
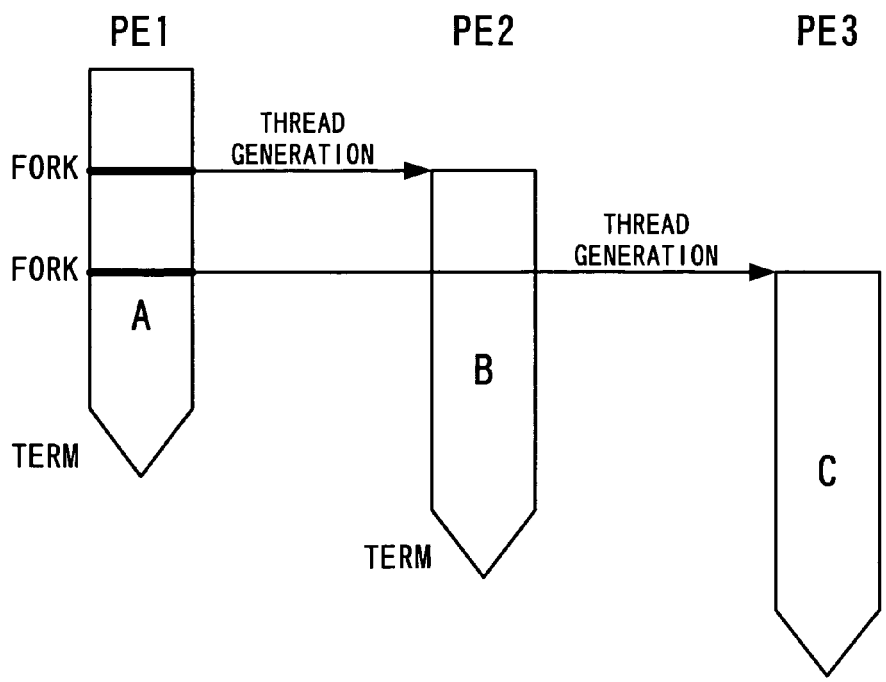
FIG. 24 is a diagram illustrating the overview of the multithreading method.
Figure 25:
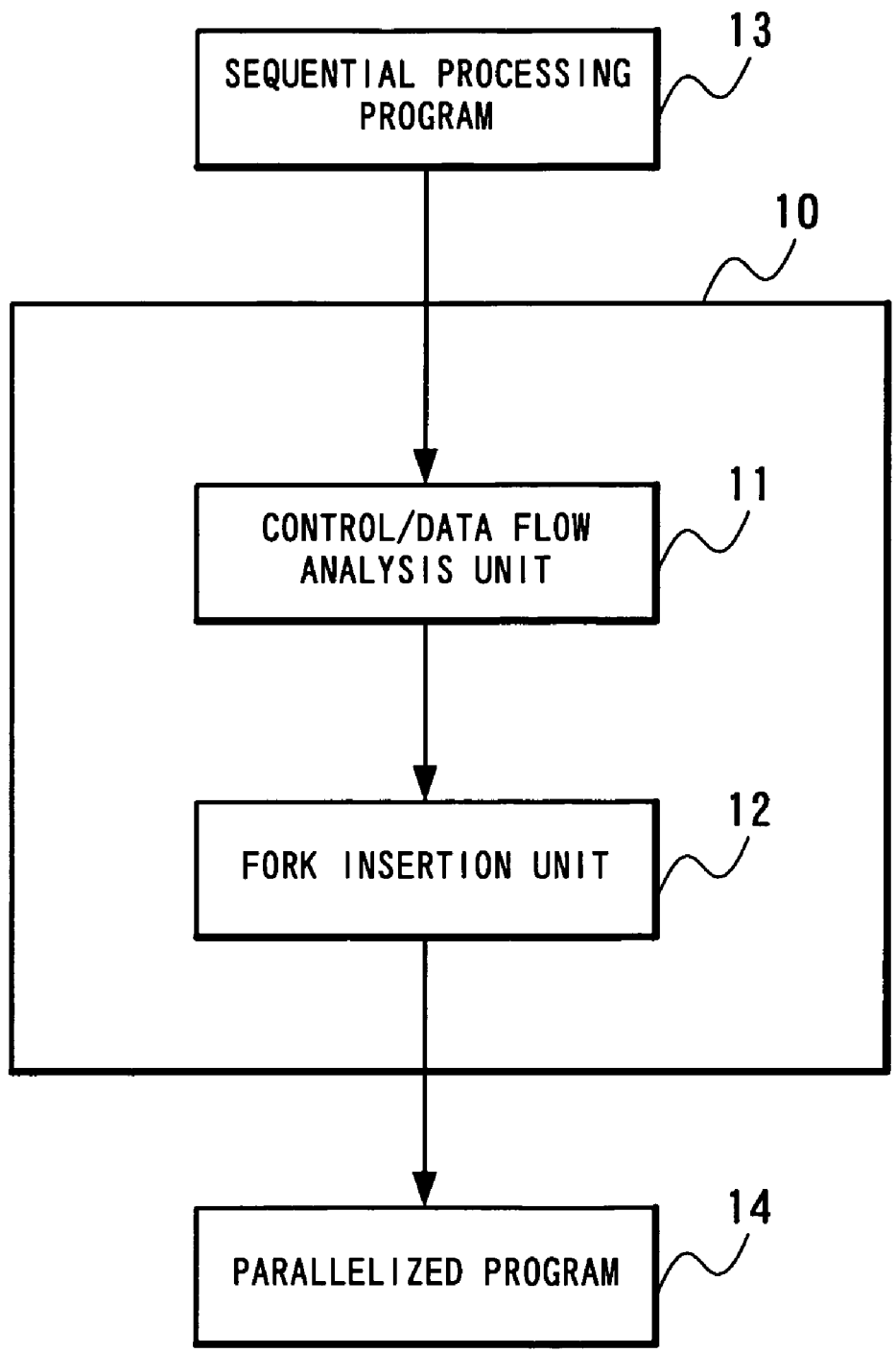
FIG. 25 is a block diagram illustrating an exemplary configuration of a conventional program parallelization device.

FIG. 20 is a block diagram illustrating the configuration of a program parallelization device 20B in accordance with a sixth embodiment of the present invention. The program parallelization device 20B in accordance with the present embodiment differs from the program parallelization device 20B in accordance with the third embodiment shown in FIG. 14 on the point that it additionally has a program parallelization program 400B. Therefore, unless otherwise noted, the same keys will be used, the detailed explanation thereof being omitted.

The program parallelization program 400B is read into the program parallelization device 20B comprised of a computer, and controls the operation of the program parallelization device 20B as a control/data flow analysis unit 21, a fork point candidate determination unit 22, a best fork point candidate combination determination unit 23B, a parallel execution performance evaluation unit 24 and a parallelized program output unit 25. Since the operation of the program parallelization device 20B, which is controlled by the program parallelization program 400B is absolutely identical to the operation of the program parallelization device 20B in the third embodiment, the detailed description will be omitted.

The first effect according to the present embodiment described above is the ability for the fork command to be appropriately inserted by the sequential processing program, allowing a parallelized program having higher parallel execution performance to be obtained. The reason is the direct evaluation of the parallel execution performance with respect to the test fork point candidate combination and the determination based on the result thereof of the best fork point candidate combination.

The second effect is the ability to considerably shorten the processing time for the best fork point candidate combination determination processing compared to a case where the parallel execution performance for all the fork point candidate combinations is evaluated. The reason is the construction of a better combination by ranking the fork point candidates in the order in which they are predicted to have an influence on the parallel execution performance, and evaluating the parallel execution performance according to this order by taking the best fork point candidate combination at that time as the reference.

The third effect is the ability to further shorten the processing time for the best fork point candidate combination determination processing. The reason is the evaluation of the parallel execution performance only with respect to the test combinations in which the fork point candidates can be executed simultaneously if a one-time fork model is adopted as a multithreading method.

The fourth effect is the ability to reduce the total number of fork point candidate combinations, allowing the best fork point candidate combination to be rapidly determined even if the number of fork point candidates is large. The reason is the determination processing of the best fork point candidate combination independently for each group by dividing the fork point candidates into the appropriate number of groups so as to minimize the mutual influence between the groups.

The fifth effect is the ability to rapidly evaluate the parallel execution performance, thus, the ability to rapidly perform the best fork point candidate combination determination processing. The reason is the simulation of parallel execution by units of thread element that are determined by the terminal point candidates.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A program parallelization device including a processor comprising:

a control/data flow analysis unit which analyzes the control flow and the data flow of a sequential processing program;

a fork point candidate determination unit which determines the fork point candidates of the sequential processing program by referring to the results of the analysis of the control flow and the data flow by said control/data flow analysis unit;

a parallel execution performance evaluation unit which evaluates, with respect to an input data, a parallel execution performance when the sequential processing program has been parallelized by a test combination of fork point candidates that were given;

a best fork point candidate combination determination unit which generates a test combination of the fork point candidates that were determined by said fork point candidate determination unit, provides the test combination to said parallel execution performance evaluation unit, and by taking the parallel execution performance of the test fork point candidate combination evaluated thereby as the reference, determines the best fork point candidate combination; and a parallelized program output unit which generates and outputs a parallelized program by inserting a fork command at each fork point candidate of the best combination determined by said best fork point candidate combination determination unit, wherein the program parallelization device transforms the sequential processing program into the parallelized program.

2. The program parallelization device as set forth in claim 1, wherein said parallel execution performance evaluation unit generates a sequential execution trace when the sequential processing program was sequentially executed with the input data, divides the sequential execution trace by taking all the terminal point candidates as division points, analyzes thread element information for each thread element, and simulates parallel execution by units of thread element with respect to the test combination of the fork point candidates that were given to calculate the parallel execution performance.

3. The program parallelization device as set forth in claim 1, wherein said best fork point candidate combination determination unit constructs a better combination by ranking the fork point candidates determined by said fork candidate determination unit in the order in which the fork point candidates are predicted to have an influence on parallel execution performance, and evaluating the parallel execution performance according to this order by taking the best fork point candidate combination at that time as the reference.

4. The program parallelization device as set forth in claim 3, wherein said best fork point candidate combination determination unit assuming that the combination of the fork point candidates including the prescribed numbers from the top in the order of the fork point candidates determined is an initial combination, evaluates the parallel execution performance of the initial combination with said parallel execution performance evaluation unit, and sets the initial combination to the best fork point candidate combination at this time.

5. The program parallelization device as set forth in claim 1, wherein said best fork point candidate combination determination unit divides said collection of all the fork point candidates that have been determined by said fork point candidate determination unit into fork point candidate groups in such a way that the fork point candidates have as little effects as possible on each other, generates a test fork point candidate combination for a group in the divided fork point candidate groups in which the best fork point candidate combination determination processing has not been performed, performs the best fork point candidate combination determination processing that determines the best fork point candidate combination by referring to the result of parallel execution performance of the test fork point candidate combination evaluated by said parallel execution performance evaluation unit, and determines the sum of the best fork point candidate combinations, which are the processing results for each group, as the overall processing result.

6. The program parallelization device as set forth in claim 5, wherein said best fork point candidate combination determination unit calls the fork point candidate group partition processing taking the collection of all the fork point candidates determined by said fork point candidate determination unit as a collection after the processing of said fork point candidate determination unit has been completed, when the fork point candidate group partition processing is called, starts the group partition processing of the collection if the number of fork point candidates belonging to the given fork point candidate collection is higher than the designated division number lower limit, returns to the origin from where the fork point candidate group partition processing was called without performing the group partition processing if the number of the fork point candidates is lower, divides from the collection the fork point candidate collections in which the number of fork point candidates that cancel themselves is higher than the designated number to generate a new group, further divides the collection into two groups, recursively calls the fork point candidate group partition processing taking one group as a collection and performs group partitioning of the group, recursively calls the fork point candidate group partitioning process taking the other group as a collection and performs group partitioning of the group, returns to the origin from where the fork point .candidate group partitioning process was called, performs the best fork point candidate combination determination processing for the groups in which the best fork point candidate combination determination processing has not been performed among the groups of fork point candidates that were divided, determines whether the processing of all the groups has been completed, if there is a group that has not been processed, reiterates the best fork point candidate combination determination processing for the groups that have not been processed, and, when the processing of all the groups has been completed, outputs the sum of the fork point candidate combination, which is the result of processing for each group, as the overall result.

7. A program parallelization device including a processor comprising:
- a control/data flow analysis unit which analyzes the control flow and the data flow of a sequential processing program;
- a fork point candidate determination unit which determines the fork point candidates of the sequential processing program by referring to the results of the analysis of the control flow and the data flow by said control/data flow analysis unit;
- a parallel execution performance evaluation unit which evaluates, with respect to an input data, a parallel execution performance when the sequential processing program has been parallelized by a test combination of fork point candidates that were given;
- a best fork point candidate combination determination unit which generates a test combination only consisting of the combination of fork point candidates that can be simultaneously executed in the one-time fork model from the fork point candidates determined by said fork point candidate determination unit, provides the test combination to said parallel execution performance evaluation unit, and by taking the parallel execution performance of the test fork point candidate combination evaluated thereby as the reference, determines the best fork point candidate combination;
- a parallelized program output unit which generates and outputs a parallelized program by inserting a fork command at each fork point candidate of the best combination determined by said best fork point candidate combination determination trait:
- wherein the program parallelization device transforms the sequential processing program into the parallelized program.

8. A program parallelization method for a multithreading method in which a sequential processing program is divided into a plurality of threads and a plurality of processors execute the threads in parallel, comprising the steps of:
- analyzing the control flow and the data flow of a sequential processing program;
- determining the fork point candidates of the sequential processing program by referring to the results of the analysis of the control flow and the data flow;
- generating a test fork point candidate combination from the determined fork point candidates;
- evaluating, with respect to an input data, the parallel execution performance when the sequential processing program has been parallelized by the generated test fork point candidate combination;
- determining a best fork point candidate combination by taking the parallel execution performance of the evaluated test fork point candidate combination as the reference; inserting a fork command at each fork point candidate in the determined best combination to generate and output a parallelized program,
- wherein the sequential processing program is transformed into the parallelized program.

9. The program parallelization method as set forth in claim 8,
- wherein the step of evaluating said parallel execution performance
- generates a sequential execution trace when the sequential processing program was sequentially executed with the input data, divides the sequential execution trace by taking all the terminal point candidates as division points, analyzes thread element information for each thread element, and simulates parallel execution by units of thread element with respect to the test combination of the fork point candidates that were given to calculate the parallel execution performance.

10. The program parallelization method as set forth in claim 8,
- wherein the step of determining the best combination of said fork point candidates
- constructs a better combination by ranking the fork point candidates determined by said fork candidate determination unit in the order in which the fork point candidates are predicted to have an influence on parallel execution performance, and evaluating the parallel execution performance according to the order by taking the best fork point candidate combination at that time as the reference.

11. The program parallelization method as set forth in claim 8,
- wherein the step of determining the best combination of said fork point candidates
- divides the collection of all the fork point candidates into fork point candidate groups in such a way that the fork point candidates have as little effects as possible on each other, generates a test fork point candidate combination for a group in the divided fork point candidate groups in which the best fork point candidate combination determination processing has not been performed, performs the best fork point candidate combination determination processing that determines the best fork point candidate combination by referring to the result of parallel execution performance of the test fork point candidate combination evaluated with respect to an input data, and determines the sum of the best fork point candidate combinations, which are the processing results for each group, as the overall processing result.

12. The program parallelization method as set forth in claim 8,
- wherein the step of determining the best combination of said fork point candidates
- calls the fork point candidate group partition processing taking the collection of all the fork point candidates determined by the fork point candidate determination unit as a collection after the processing of said fork point candidate determination unit has been completed, when the fork point candidate group partition processing is called, starts the group partition processing of the collection if the number of fork point candidates belonging to the given fork point candidate collection is higher than the designated division number lower limit, returns to the origin from where the fork point candidate group partition processing was called without performing the group partition processing if the number of the fork point candidates is lower, divides from the collection the fork point candidate collections in which the number of fork point candidates that cancel themselves is higher than the designated number to generate a new group, further divides the collection into two groups, recursively calls the fork point candidate group partition processing taking one group as a collection and performs group partitioning of the group, recursively calls the fork point candidate group partitioning process taking the other group as a collection and performs group partitioning of the group, returns to the origin from where the fork point candidate group partitioning process was called, performs the best fork point candidate combination determination processing for the groups in which the best fork point candidate combination determination processing has not been performed among the groups of fork point candidates that were divided, determines whether the processing of all the groups has been completed, if there is a group that has not been processed, reiterates the best fork point candidate combination determination processing for the groups that have not been processed, and, when the processing of all the groups has been completed, outputs the sum of the fork point candidate combination, which is the result of processing for each group, as the overall result.

13. A program parallelization method for a multithreading method in which a sequential processing program is divided into a plurality of threads and a plurality of processors execute the threads in parallel, comprising the steps of:
   analyzing the control flow and the data flow of a sequential processing program;
   determining the fork point candidates of the sequential processing program by referring to the results of the analysis of the control flow and the data flow;
   generating a test combination only consisting of the fork point candidates that can be simultaneously executed in the one-time fork model from the determined fork point candidates;
   evaluating, with respect to an input data, the parallel execution performance when the sequential processing program has been parallelized by the generated test fork point candidate combination;
   determining a best fork point candidate combination by taking the parallel execution performance of the evaluated test fork point candidate combination as the reference;
   inserting a fork command at each fork point candidate in the determined best combination to generate and output a parallelized program,
   wherein the sequential processing program is transformed into the parallelized program.

14. A program parallelization method for a multithreading method in which a sequential processing program is divided into a plurality of threads and a plurality of processors execute the threads in parallel, comprising:
   a step in which a control/data flow analysis unit analyzes the control flow and the data flow of a sequential processing program;
   a step in which a fork point candidate determination unit generates the fork point candidates by referring to the results of the analysis of the control flow and the data flow by the control/data flow analysis unit;
   a step in which a best fork point candidate combination determination unit predicts the effect of each of all the fork point candidates on the parallel execution performance and ranks the fork point candidates in the order of the effect;
   a step in which the best fork point candidate combination determination unit generates an initial fork point candidate combination whose parallel execution performance is evaluated first, and which is assumed to be the best fork point candidate combination;
   a step in which a parallel execution performance evaluation unit generates a sequential execution trace when the sequential processing program was sequentially executed with the input data;
   a step in which the parallel execution performance evaluation unit divides the sequential execution trace by taking all the terminal point candidates as division points
   a step in which the parallel execution performance evaluation unit analyzes thread element information for each thread element, and memorizes the thread element information for each thread element;
   a step in which a best fork point candidate combination determination unit selects one fork point candidate that is ranked highest order among the non-selected fork point candidates;
   a step in which the best fork point candidate combination determination unit assesses whether the fork point candidate selected is contained in the best fork point candidate combination;
   a step in which, if the selected fork point candidate is not contained in the best fork point candidate combination, the best fork point candidate combination determination unit adds the selected fork point candidate to the best fork point candidate combination, and sets the fork point candidate combination as a test combination;
   a step in which, if the selected fork point candidate is contained in the best fork point candidate combination, the best fork point candidate combination determination unit removes the selected fork point candidate from the best fork point candidate combination, and sets the fork point candidate combination as the test combination;
   a step in which the best fork point candidate combination determination unit evaluates the parallel execution performance of parallelization by the test combination through the parallel execution performance evaluation unit;
   a step in which the best fork point candidate combination determination unit compares the parallel execution performance of the test combination with the parallel execution performance of the best combination;
   a step in which, if the parallel execution performance of the test combination is better, the best fork point candidate combination determination unit sets the test combination as the best fork point candidate combination at the current time;
   a step in which the best fork point candidate combination determination unit assesses whether a fork point candidate that has not been selected exists, and if a fork point candidate that has not been selected exists, reiterates execution;
   a step in which, if a non-selected fork point candidate does not exist, the best fork point candidate combination determination unit assesses whether a new best fork point candidate combination is found in the previous iterative execution;
   a step in which, if a new best fork point candidate combination is found, the best fork point candidate combination determination unit sets all the fork point candidates to the non-selected state for the iterative execution;
   a step in which, if a new best fork point candidate combination is not found, the best fork point candidate combination determination unit outputs the determined best fork point candidate combination as the result of the best fork point candidate combination determination processing; and
   a step in which a parallelized program output unit generates and outputs the parallelized program by inserting a fork command at each fork point candidate of the best combination determined by the best fork point candidate combination determination unit,
   wherein the sequential processing program is transformed into the parallelized program.

15. A program parallelization method for a multithreading method in which a sequential processing program is divided into a plurality of threads and a plurality of processors execute the threads in parallel, comprising:

a step in which a control/data flow analysis unit analyzes the control flow and the data flow of a sequential processing program;

a step in which a fork point candidate determination unit generates the fork point candidates by referring to the results of the analysis of the control flow and the data flow by the control/data flow analysis unit;

a step in which a best fork point candidate combination determination unit predicts the effect of each of all the fork point candidates on the parallel execution performance and ranks the fork point candidates in the order of the effect;

a step in which the best fork point candidate combination determination unit generates an initial fork point candidate combination whose parallel execution performance is evaluated first, and which is assumed to be the best fork point candidate combination;

a step in which a parallel execution performance evaluation unit generates a sequential execution trace when the sequential processing program was sequentially executed with the input data; a step in which the parallel execution performance evaluation unit divides the sequential execution trace by taking all the terminal point candidates as division points;

a step in which the parallel execution performance evaluation unit analyzes thread element information for each thread element, and memorizes the thread element information for each thread element;

a step in which a best fork point candidate combination determination unit selects one fork point candidate that is ranked highest order among the non-selected fork point candidates;

a step in which the best fork point candidate combination determination unit assesses whether the selected fork point candidate is contained in the best fork point candidate combination;

a step in which, if the selected fork point candidate is not contained in the best fork point candidate combination, the best fork point candidate combination determination unit adds the selected fork point candidate to the best fork point candidate combination, and sets the fork point candidate combination as a test combination; a step in which the best fork point candidate combination determination unit removes the fork point candidate that cancels the selected fork point candidate from the test combination;

a step in which, if the selected fork point candidate is contained in the best fork point candidate combination, the best fork point candidate combination determination unit removes the selected fork point candidate from the best fork point candidate combination, and sets the fork point candidate combination as the test combination;

a step in which the best fork point candidate combination determination unit evaluates the parallel execution performance of parallelization by the test combination through the parallel execution performance evaluation unit;

a step in which the best fork point candidate combination determination unit compares the parallel execution performance of the test combination with the parallel execution performance of the best combination;

a step in which, if the parallel execution performance of the test combination is better, the best fork point candidate combination determination unit removes the fork point candidate that is canceled by the selected fork point candidate from the test combination;

a step in which the best fork point candidate combination determination unit sets the test combination as the best fork point candidate combination at the current time;

a step in which the best fork point candidate combination determination unit assesses whether a fork point candidate that has not been selected exists, and if a fork point candidate that has not been selected exists, reiterates execution;

a step in which, if a non-selected fork point candidate does not exist, the best fork point candidate combination determination unit assesses whether a new best fork point candidate combination is found in the previous iterative execution;

a step in which, if a new best fork point candidate combination is found, the best fork point candidate combination determination unit sets all the fork point candidates to the non-selected state for the iterative execution;

a step in which, if a new best fork point candidate combination is not found, the best fork point candidate combination determination unit outputs the determined best fork point candidate combination to the parallelized program output unit as the result of the best fork point candidate combination determination processing; and a step in which the parallelized program output unit generates and outputs the parallelized program by inserting a fork command at each fork point candidate of the best combination determined by the best fork point candidate combination determination units, wherein the sequential processing program is transformed into the parallelized program.

16. A computer storage medium embodying a computer program parallelization program that is executed on a computer causing, a computer to operate as a control/data flow analysis function which analyzes the control flow and the dataflow of a sequential processing program;

a fork point candidate determination function which determines the fork point candidates of the sequential processing program by referring to the results of the analysis of the control flow and the data flow by said control/data flow analysis function;

a parallel execution performance evaluation function which evaluates, with respect to an input data, a parallel execution performance when the sequential processing program has been parallelized by a test combination of fork point candidates that were given;

a best fork point candidate combination determination function which generates a test combination of the fork point candidates that were determined by said fork point candidate determination function, provides the test combination to said parallel execution performance evaluation function, and by taking the parallel execution performance of the test fork point candidate combination evaluated thereby as the reference determines the best fork point candidate combination; and a parallelized program output function which generates and outputs a parallelized program by inserting a fork command at each fork point candidate of the best combination determined by said best fork point candidate combination determination function.

17. The computer storage medium as set forth in claim 16, wherein said parallel execution performance evaluation function generates a sequential execution trace when the sequential processing program was sequentially executed with the input data, divides the sequential execution trace by taking all the terminal point candidates as division points, analyzes thread element information for each thread element, and simulates parallel execution by units of thread element with respect to the test combination of the fork point candidates that were given to calculate the parallel execution performance.

18. The computer storage medium as set forth in claim 16, wherein said best fork point candidate combination determination function constructs a better combination by ranking the fork point candidates determined by said fork candidate determination function in the order in which the fork point candidates are predicted to have an influence on parallel execution performance, and evaluating the parallel execution performance according to the order by taking the best fork point candidate combination at that time as the reference.

19. The computer storage medium as set forth in claim 18, wherein said best fork point candidate combination determination function assuming that the combination of the fork point candidates including the prescribed numbers from the top in the order of the fork point candidates determined is an initial combination, evaluates the parallel execution performance of the initial combination with said parallel execution performance evaluation function, and sets the initial combination to the best fork point candidate combination at this time.

20. The computer storage medium as set forth in claim 16, wherein said best fork point candidate combination determination function divides the collection of all the fork point candidates that have been determined by said fork point candidate determination function into fork point candidate groups in such a way that the fork point candidates have as little effects as possible on each other, generates a test fork point candidate combination for a group in the divided fork point candidate groups in which the best fork point candidate combination determination processing has not been performed, performs the best fork point candidate combination determination processing that determines the best fork point candidate combination by referring to the result of parallel execution performance of the test fork point candidate combination evaluated by said parallel execution performance evaluation function, and determines the sum of the best fork point candidate combinations, which are the processing results for each group, as the overall processing result.

21. The computer storage medium as set forth in claim 20, wherein said best fork point candidate combination determination function calls the fork point candidate group partition processing taking the collection of all the fork point candidates determined by said fork point candidate determination function as a collection after the processing of said fork point candidate determination function has been completed, when the fork point candidate group partition processing is called, starts the group partition processing of the collection if the number of fork point candidates belonging to the given fork point candidate collection is higher than the designated division number lower limit, returns to the origin from where the fork point candidate group partition processing was called without performing the group partition processing if the number of the fork point candidates is lower, divides from the collection the fork point candidate collections in which the number of fork point candidates that cancel themselves is higher than the designated number to generate a new group, further divides the collection into two groups, recursively calls the fork point candidate group partition processing taking one group as a collection and performs group partitioning of the group, recursively calls the fork point candidate group partitioning process taking the other group as a collection and performs group partitioning of the group, returns to the origin from where the fork point candidate group partitioning process was called, performs the best fork point candidate combination determination processing for the groups in which the best fork point candidate combination determination processing has not been performed among the groups of fork point candidates that were divided, determines whether the processing of all the groups has been completed, if there is a group that has not been processed, reiterates the best fork point candidate combination determination processing for the groups that have not been processed, and, when the processing of all the groups has been completed, outputs the sum of the fork point candidate combination, which is the result of processing for each group, as the overall result.

22. A computer storage medium embodying a computer program parallelization program that is executed on a computer causing, a computer to operate as a control/data flow analysis function which analyzes the control flow and the data flow of a sequential processing program;

a fork point candidate determination function which determines the fork point candidates of the sequential processing program by referring to the results of the analysis of the control flow and the data flow by said control/data flow analysis function;

a parallel execution performance evaluation function which evaluates, with respect to an input data, a parallel execution performance when the sequential processing program has been parallelized by a test combination of fork point candidates that were given;

a best fork point candidate combination determination function which generates a test combination only consisting of the combination of fork point candidates that can be simultaneously executed in the one-time fork model from the fork point candidates determined by said fork point candidate determination function, provides the test combination to said parallel execution performance evaluation function, and by taking the parallel execution performance of the test fork point candidate combination evaluated thereby as the reference, determines the best fork point candidate combination;

a parallelized program output function which generates and outputs a parallelized program by inserting a fork command at each fork point candidate of the best combination determined by said best fork point candidate combination determination function.

* * * * *